US007324436B2

(12) United States Patent
You et al.

(10) Patent No.: US 7,324,436 B2
(45) Date of Patent: Jan. 29, 2008

(54) DETERMINING USEABLE COMBINATIONS OF VARIABLES FOR TRANSMITTING A SUBPACKET OF AN ENCODER PACKET

(75) Inventors: Cheol Woo You, Seoul (KR); Ki Jun Kim, Seoul (KR); Young Woo Yun, Seoul (KR); Soon Yil Kwon, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 1032 days.

(21) Appl. No.: 10/422,726

(22) Filed: Apr. 25, 2003

(65) Prior Publication Data

US 2003/0202461 A1    Oct. 30, 2003

(30) Foreign Application Priority Data

| Apr. 30, 2002 | (KR) | 10-2002-0023840 |
| May 4, 2002 | (KR) | 10-2002-0024627 |
| May 11, 2002 | (KR) | 10-2002-0026003 |
| May 22, 2002 | (KR) | 10-2002-0028526 |

(51) Int. Cl.
*H04J 11/00*    (2006.01)

(52) U.S. Cl. ............ 370/209; 370/342; 370/343; 370/441; 375/240.1

(58) Field of Classification Search ........... 370/209, 370/208, 342, 343, 441; 375/146, 240.1, 375/261, 298
See application file for complete search history.

(56) References Cited

U.S. PATENT DOCUMENTS

2001/0053141 A1   12/2001   Periyalwar et al. .......... 370/337

2002/0141433 A1 *   10/2002   Kwon et al. ............... 370/441
2003/0031230 A1 *   2/2003   Kwon et al. ............... 375/130
2003/0165189 A1 *   9/2003   Kadous ..................... 375/225

FOREIGN PATENT DOCUMENTS

WO    WO 00/33476    6/2000

OTHER PUBLICATIONS

Samsung Electronics, "A Selection Method of Modulation Scheme Based on Simulation," 3GPP2, TSG-C WG5, C50-20011203-014, Maui, Dec. 3, 2001.
International Search Report.

* cited by examiner

*Primary Examiner*—Seema S. Rao
*Assistant Examiner*—Wanda Z Russell
(74) *Attorney, Agent, or Firm*—Ked & Associates, LLP

(57) ABSTRACT

A method of determining useable combinations of variables for transmitting a subpacket of an encoder packet in a communication system is disclosed. First, an arbitrary combination from a plurality of all combinations of transmission variables is selected based on a number of currently useable Walsh codes and channel environment. Next, an arbitrary MPR is determined based on a number of useable encoder packet bits, a number of useable slots, and the number of currently useable Walsh codes, all of which belong to the selected arbitrary combination transmission variables. Thereafter, a final MPR, which is the smallest one of MPR values of a MPR set that corresponds to the number of useable encoder packet bits and the number of useable slots, is determined, and a final number of Walsh codes is calculated based on the number of useable encoder packet bits, the number of useable slots, and the determined final MPR. Finally, one or more useable combinations of variables are determined based on the final number of Walsh codes.

18 Claims, 17 Drawing Sheets

FIG.2

| $N_{Walsh,k}$ | $N_{slot,k}$ | $MPR_k$ | $m_k$ | $c_k$ |
|---|---|---|---|---|
| ⋮ | ⋮ | ⋮ | ⋮ | ⋮ |
| 28 | 4 | 0.7188 | 2 | 0.3594 |
| 27 | 4 | 0.7454 | 2 | 0.3727 |
| 26 | 4 | 0.7740 | 2 | 0.3870 |
| 25 | 4 | 0.8050 | 2 | 0.4025 |
| 24 | 4 | 0.8385 | 2 | 0.4193 |
| 23 | 4 | 0.8750 | 2 | 0.4375 |
| 22 | 4 | 0.9148 | 2 | 0.4574 |
| 21 | 4 | 0.9583 | 2 | 0.4792 |
| 20 | 4 | 1.0063 | 2 | 0.5031 |
| 19 | 4 | 1.0592 | 2 | 0.5296 |
| 18 | 4 | 1.1181 | 2 | 0.5590 |
| 17 | 4 | 1.1838 | 2 | 0.5919 |
| 16 | 4 | 1.2578 | 2 | 0.6289 |
| 15 | 4 | 1.3417 | 2 | 0.6708 |
| 14 | 4 | 1.4375 | 2 | 0.7188 |
| 13 | 4 | 1.5481 | 3 | 0.5160 |
| 12 | 4 | 1.6771 | 3 | 0.5590 |
| 11 | 4 | 1.8295 | 3 | 0.6093 |
| 10 | 4 | 2.0125 | 4 | 0.5031 |
| ⋮ | ⋮ | ⋮ | ⋮ | ⋮ |

FIG.3

| $N_{Walsh,k}$ | $N_{slot,k}$ | $MPR_k$ | $m_k$ | $c_k$ |
|---|---|---|---|---|
| ⋮ | ⋮ | ⋮ | ⋮ | ⋮ |
| 28 | 2 | 1.4375 | 2 | 0.7188 |
| 27 | 2 | 1.4907 | 2 | 0.7454 |
| 26 | 2 | 1.5481 | 3 | 0.5160 |
| 25 | 2 | 1.6100 | 3 | 0.5367 |
| 24 | 2 | 1.6771 | 3 | 0.5590 |
| 23 | 2 | 1.7500 | 3 | 0.5833 |
| 22 | 2 | 1.8295 | 3 | 0.6098 |
| 21 | 2 | 1.9167 | 3 | 0.6389 |
| 20 | 2 | 2.0125 | 4 | 0.5031 |
| 19 | 2 | 2.1184 | 4 | 0.5296 |
| 18 | 2 | 2.2361 | 4 | 0.5590 |
| 17 | 2 | 2.3676 | 4 | 0.5919 |
| 16 | 2 | 2.5156 | 4 | 0.6289 |
| 15 | 2 | 2.6833 | 4 | 0.6708 |
| 14 | 2 | 2.8750 | 4 | 0.7188 |
| ⋮ | ⋮ | ⋮ | ⋮ | ⋮ |

FIG.4

| $N_{Walsh,k}$ | $N_{slot,k}$ | $MPR_k$ | $m_k$ | $c_k$ |
|---|---|---|---|---|
| ⋮ | ⋮ | ⋮ | ⋮ | ⋮ |
| 28 | 1 | 2.8750 | 4 | 0.7188 |
| 27 | 1 | 2.9815 | 4 | 0.7454 |
| ⋮ | ⋮ | ⋮ | ⋮ | ⋮ |

FIG.5

| $N_{Walsh,k}$ | $N_{slot,k}$ | $MPR_k$ | $m_k$ | $c_k$ | $N_{Walsh,k}$ | $N_{slot,k}$ | $MPR_k$ | $m_k$ | $c_k$ |
|---|---|---|---|---|---|---|---|---|---|
| 28 | 4 | 0.7188 | 2 | 0.3594 | 7 | 4 | 2.8750 | 4 | 0.7188 |
| 27 | 4 | 0.7454 | 2 | 0.3727 | 28 | 2 | 1.4375 | 2 | 0.7188 |
| 26 | 4 | 0.7740 | 2 | 0.3870 | 27 | 2 | 1.4907 | 2 | 0.7454 |
| 25 | 4 | 0.8050 | 2 | 0.4025 | 26 | 2 | 1.5481 | 3 | 0.5160 |
| 24 | 4 | 0.8385 | 2 | 0.4193 | 25 | 2 | 1.6100 | 3 | 0.5367 |
| 23 | 4 | 0.8750 | 2 | 0.4375 | 24 | 2 | 1.6771 | 3 | 0.5590 |
| 22 | 4 | 0.9148 | 2 | 0.4574 | 23 | 2 | 1.7500 | 3 | 0.5833 |
| 21 | 4 | 0.9583 | 2 | 0.4792 | 22 | 2 | 1.8295 | 3 | 0.6098 |
| 20 | 4 | 1.0063 | 2 | 0.5031 | 21 | 2 | 1.9167 | 3 | 0.6389 |
| 19 | 4 | 1.0592 | 2 | 0.5296 | 20 | 2 | 2.0125 | 4 | 0.5031 |
| 18 | 4 | 1.1181 | 2 | 0.5590 | 19 | 2 | 2.1184 | 4 | 0.5296 |
| 17 | 4 | 1.1838 | 2 | 0.5919 | 18 | 2 | 2.2361 | 4 | 0.5590 |
| 16 | 4 | 1.2578 | 2 | 0.6289 | 17 | 2 | 2.3676 | 4 | 0.5919 |
| 15 | 4 | 1.3417 | 2 | 0.6708 | 16 | 2 | 2.5156 | 4 | 0.6289 |
| 14 | 4 | 1.4375 | 2 | 0.7188 | 15 | 2 | 2.6833 | 4 | 0.6708 |
| 13 | 4 | 1.5481 | 3 | 0.5160 | 14 | 2 | 2.8750 | 4 | 0.7188 |
| 12 | 4 | 1.6771 | 3 | 0.5590 | 13 | 2 | 3.0962 | 4 | 0.7740 |
| 11 | 4 | 1.8295 | 3 | 0.6098 | 28 | 1 | 2.8750 | 4 | 0.7188 |
| 10 | 4 | 2.0125 | 4 | 0.5031 | 27 | 1 | 2.9815 | 4 | 0.7454 |
| 9 | 4 | 2.2361 | 4 | 0.5590 | 26 | 1 | 3.0962 | 4 | 0.7740 |
| 8 | 4 | 2.5155 | 4 | 0.6289 | | | | | |

FIG.6

| $N_{Walsh,k}$ | $N_{slot,k}$ | $MPR_k$ | $m_k$ | $c_k$ | $N_{Walsh,k}$ | $N_{slot,k}$ | $MPR_k$ | $m_k$ | $c_k$ |
|---|---|---|---|---|---|---|---|---|---|
| 28 | 4 | 0.7188 | 2 | 0.3594 | 7 | 4 | 2.8750 | 4 | 0.7188 |
| 27 | 4 | 0.7454 | 2 | 0.3727 | 28 | 2 | 1.4375 | 2 | 0.7188 |
| 26 | 4 | 0.7740 | 2 | 0.3870 | 27 | 2 | 1.4907 | 2 | 0.7454 |
| 25 | 4 | 0.8050 | 2 | 0.4025 | 26 | 2 | 1.5481 | 3 | 0.5160 |
| 24 | 4 | 0.8385 | 2 | 0.4193 | 25 | 2 | 1.6100 | 3 | 0.5367 |
| 23 | 4 | 0.8750 | 2 | 0.4375 | 24 | 2 | 1.6771 | 3 | 0.5590 |
| 22 | 4 | 0.9148 | 2 | 0.4574 | 23 | 2 | 1.7500 | 3 | 0.5833 |
| 21 | 4 | 0.9583 | 2 | 0.4792 | 22 | 2 | 1.8295 | 3 | 0.6098 |
| 20 | 4 | 1.0063 | 2 | 0.5031 | 21 | 2 | 1.9167 | 3 | 0.6389 |
| 19 | 4 | 1.0592 | 2 | 0.5296 | 20 | 2 | 2.0125 | 4 | 0.5031 |
| 18 | 4 | 1.1181 | 2 | 0.5590 | 19 | 2 | 2.1184 | 4 | 0.5296 |
| 17 | 4 | 1.1838 | 2 | 0.5919 | 18 | 2 | 2.2361 | 4 | 0.5590 |
| 16 | 4 | 1.2578 | 2 | 0.6289 | 17 | 2 | 2.3676 | 4 | 0.5919 |
| 15 | 4 | 1.3417 | 2 | 0.6708 | 16 | 2 | 2.5156 | 4 | 0.6289 |
| 14 | 4 | 1.4375 | 2 | 0.7188 | 15 | 2 | 2.6833 | 4 | 0.6708 |
| 13 | 4 | 1.5481 | 3 | 0.5160 | 14 | 2 | 2.8750 | 4 | 0.7188 |
| 12 | 4 | 1.6771 | 3 | 0.5590 | 13 | 2 | 3.0962 | 4 | 0.7740 |
| 11 | 4 | 1.8295 | 3 | 0.6098 | 28 | 1 | 2.8750 | 4 | 0.7188 |
| 10 | 4 | 2.0125 | 4 | 0.5031 | 27 | 1 | 2.9815 | 4 | 0.7454 |
| 9 | 4 | 2.2361 | 4 | 0.5590 | 26 | 1 | 3.0962 | 4 | 0.7740 |
| 8 | 4 | 2.5155 | 4 | 0.6289 | | | | | |

FIG. 7

| Index | $N_{slot,k=1}$ | | $N_{slot,k=2}$ | | $N_{slot,k=4}$ | |
|---|---|---|---|---|---|---|
| | $N_{zp}$ | $N_{walsh,k}$ | $N_{zp}$ | $N_{walsh,k}$ | $N_{zp}$ | $N_{walsh,k}$ |
| 000000 | 3864 | 28 | 3864 | 27 | 3864 | 25 |
| 000001 | 3864 | 27 | 3864 | 26 | 3864 | 20 |
| 000010 | 3864 | 26 | 3864 | 23 | 3864 | 18 |
| 000011 | 3096 | 28 | 3864 | 22 | 3864 | 16 |
| 000100 | 3096 | 26 | 3864 | 21 | 3864 | 15 |
| 000101 | 3096 | 25 | 3864 | 19 | 3864 | 14 |
| 000110 | 3096 | 24 | 3864 | 18 | 3864 | 13 |
| 000111 | 3096 | 23 | 3864 | 17 | 3864 | 12 |
| 001000 | 3096 | 22 | 3864 | 16 | 3864 | 11 |
| 001001 | 3096 | 21 | 3864 | 15 | 3864 | 10 |
| 001010 | 2328 | 28 | 3864 | 14 | 3864 | 9 |
| 001011 | 2328 | 26 | 3864 | 13 | 3864 | 8 |
| 001100 | 2328 | 25 | 3096 | 28 | 3864 | 7 |
| 001101 | 2328 | 22 | 3096 | 25 | 3096 | 27 |
| 001110 | 2328 | 21 | 3096 | 23 | 3096 | 20 |
| 001111 | 2328 | 20 | 3096 | 22 | 3096 | 16 |
| 010000 | 2328 | 19 | 3096 | 21 | 3096 | 14 |
| 010001 | 2328 | 18 | 3096 | 19 | 3096 | 13 |
| 010010 | 2328 | 17 | 3096 | 17 | 3096 | 12 |
| 010011 | 2328 | 16 | 3096 | 15 | 3096 | 11 |
| 010100 | 1560 | 28 | 3096 | 14 | 3096 | 10 |
| 010101 | 1560 | 25 | 3096 | 13 | 3096 | 9 |
| 010110 | 1560 | 24 | 3096 | 12 | 3096 | 8 |
| 010111 | 1560 | 22 | 3096 | 11 | 3096 | 7 |
| 011000 | 1560 | 21 | 2328 | 24 | 3096 | 6 |
| 011001 | 1560 | 19 | 2328 | 21 | 2328 | 21 |
| 011010 | 1560 | 18 | 2328 | 19 | 2328 | 15 |
| 011011 | 1560 | 17 | 2328 | 18 | 2328 | 12 |
| 011100 | 1560 | 15 | 2328 | 17 | 2328 | 11 |
| 011101 | 1560 | 14 | 2328 | 16 | 2328 | 10 |
| 011110 | 1560 | 13 | 2328 | 14 | 2328 | 9 |
| 011111 | 1560 | 12 | 2328 | 13 | 2328 | 8 |
| 100000 | 1560 | 11 | 2328 | 11 | 2328 | 7 |
| 100001 | 792 | 28 | 2328 | 10 | 2328 | 6 |
| 100010 | 792 | 21 | 2328 | 9 | 1560 | 5 |
| 100011 | 792 | 17 | 2328 | 8 | 1560 | 4 |
| 100100 | 792 | 14 | 1560 | 27 | 1560 | 24 |
| 100101 | 792 | 13 | 1560 | 20 | 1560 | 14 |
| 100110 | 792 | 12 | 1560 | 16 | 1560 | 10 |
| 100111 | 792 | 11 | 1560 | 14 | 1560 | 8 |
| 101000 | 792 | 10 | 1560 | 13 | 1560 | 7 |
| 101001 | 792 | 9 | 1560 | 12 | 1560 | 6 |
| 101010 | 792 | 8 | 1560 | 11 | 1560 | 5 |
| 101011 | 792 | 7 | 1560 | 10 | 1560 | 4 |
| 101100 | 792 | 6 | 1560 | 9 | 1560 | 3 |
| 101101 | 408 | 25 | 1560 | 8 | 792 | 12 |
| 101110 | 408 | 15 | 1560 | 7 | 792 | 7 |
| 101111 | 408 | 11 | 1560 | 6 | 792 | 6 |
| 110000 | 408 | 9 | 792 | 24 | 792 | 5 |
| 110001 | 408 | 8 | 792 | 14 | 792 | 4 |
| 110010 | 408 | 7 | 792 | 11 | 792 | 3 |
| 110011 | 408 | 6 | 792 | 9 | 792 | 2 |
| 110100 | 408 | 5 | 792 | 7 | 408 | 22 |
| 110101 | 408 | 4 | 792 | 6 | 408 | 7 |
| 110110 | 408 | 3 | 792 | 5 | 408 | 4 |
| 110111 | Reserved | Reserved | 792 | 4 | 408 | 3 |
| 111000 | Reserved | Reserved | 792 | 3 | 408 | 2 |
| 111001 | Reserved | Reserved | 408 | 13 | 408 | 1 |
| 111010 | Reserved | Reserved | 408 | 8 | Reserved | Reserved |
| 111011 | Reserved | Reserved | 408 | 6 | Reserved | Reserved |
| 111100 | Reserved | Reserved | 408 | 5 | Reserved | Reserved |
| 111101 | Reserved | Reserved | 408 | 4 | Reserved | Reserved |
| 111110 | Reserved | Reserved | 408 | 3 | Reserved | Reserved |
| 111111 | Reserved | Reserved | 408 | 2 | Reserved | Reserved |

FIG. 8

| Index | $N_{slot,k=1}$ | | $N_{slot,k=2}$ | | $N_{slot,k=4}$ | |
|---|---|---|---|---|---|---|
| | $N_{TP}$ | $N_{TFCI,k}$ | $N_{TP}$ | $N_{TFCI,k}$ | $N_{TP}$ | $N_{TFCI,k}$ |
| 000000 | 3864 | 28 | 3864 | 27 | 3864 | 20 |
| 000001 | 3864 | 27 | 3864 | 26 | 3864 | 18 |
| 000010 | 3864 | 26 | 3864 | 23 | 3864 | 16 |
| 000011 | 3096 | 28 | 3864 | 22 | 3864 | 15 |
| 000100 | 3096 | 26 | 3864 | 21 | 3864 | 14 |
| 000101 | 3096 | 25 | 3864 | 19 | 3864 | 13 |
| 000110 | 3096 | 24 | 3864 | 18 | 3864 | 12 |
| 000111 | 3096 | 23 | 3864 | 17 | 3864 | 11 |
| 001000 | 3096 | 22 | 3864 | 16 | 3864 | 10 |
| 001001 | 3096 | 21 | 3864 | 15 | 3864 | 9 |
| 001010 | 2328 | 28 | 3864 | 14 | 3864 | 8 |
| 001011 | 2328 | 26 | 3864 | 13 | 3864 | 7 |
| 001100 | 2328 | 25 | 3096 | 28 | 3096 | 20 |
| 001101 | 2328 | 22 | 3096 | 25 | 3096 | 16 |
| 001110 | 2328 | 21 | 3096 | 23 | 3096 | 14 |
| 001111 | 2328 | 20 | 3096 | 22 | 3096 | 13 |
| 010000 | 2328 | 19 | 3096 | 21 | 3096 | 12 |
| 010001 | 2328 | 18 | 3096 | 19 | 3096 | 11 |
| 010010 | 2328 | 17 | 3096 | 17 | 3096 | 10 |
| 010011 | 2328 | 16 | 3096 | 15 | 3096 | 9 |
| 010100 | 1560 | 28 | 3096 | 14 | 3096 | 8 |
| 010101 | 1560 | 25 | 3096 | 13 | 3096 | 7 |
| 010110 | 1560 | 24 | 3096 | 12 | 3096 | 6 |
| 010111 | 1560 | 22 | 3096 | 11 | 3096 | 20 |
| 011000 | 1560 | 21 | 2328 | 24 | 2328 | 15 |
| 011001 | 1560 | 19 | 2328 | 21 | 2328 | 12 |
| 011010 | 1560 | 18 | 2328 | 19 | 2328 | 11 |
| 011011 | 1560 | 17 | 2328 | 18 | 2328 | 10 |
| 011100 | 1560 | 15 | 2328 | 17 | 2328 | 9 |
| 011101 | 1560 | 14 | 2328 | 16 | 2328 | 8 |
| 011110 | 1560 | 13 | 2328 | 14 | 2328 | 7 |
| 011111 | 1560 | 12 | 2328 | 13 | 2328 | 6 |
| 100000 | 1560 | 11 | 2328 | 11 | 2328 | 5 |
| 100001 | 792 | 28 | 2328 | 10 | 2328 | 4 |
| 100010 | 792 | 21 | 2328 | 9 | 1560 | 20 |
| 100011 | 792 | 17 | 2328 | 8 | 1560 | 14 |
| 100100 | 792 | 14 | 1560 | 27 | 1560 | 10 |
| 100101 | 792 | 13 | 1560 | 20 | 1560 | 8 |
| 100110 | 792 | 12 | 1560 | 16 | 1560 | 7 |
| 100111 | 792 | 11 | 1560 | 14 | 1560 | 6 |
| 101000 | 792 | 10 | 1560 | 13 | 1560 | 5 |
| 101001 | 792 | 9 | 1560 | 12 | 1560 | 4 |
| 101010 | 792 | 8 | 1560 | 11 | 1560 | 3 |
| 101011 | 792 | 7 | 1560 | 10 | 792 | 11 |
| 101100 | 792 | 6 | 1560 | 9 | 792 | 7 |
| 101101 | 408 | 25 | 1560 | 8 | 792 | 6 |
| 101110 | 408 | 15 | 1560 | 7 | 792 | 5 |
| 101111 | 408 | 11 | 1560 | 6 | 792 | 4 |
| 110000 | 408 | 9 | 1560 | 21 | 792 | 3 |
| 110001 | 408 | 8 | 792 | 14 | 792 | 2 |
| 110010 | 408 | 7 | 792 | 11 | 408 | 7 |
| 110011 | 408 | 6 | 792 | 9 | 408 | 4 |
| 110100 | 408 | 5 | 792 | 7 | 408 | 3 |
| 110101 | 408 | 4 | 792 | 6 | 408 | 2 |
| 110110 | 408 | 3 | 792 | 5 | 408 | 1 |
| 110111 | Reserved | Reserved | 792 | 4 | Reserved | Reserved |
| 111000 | Reserved | Reserved | 792 | 3 | Reserved | Reserved |
| 111001 | Reserved | Reserved | 408 | 13 | Reserved | Reserved |
| 111010 | Reserved | Reserved | 408 | 8 | Reserved | Reserved |
| 111011 | Reserved | Reserved | 408 | 6 | Reserved | Reserved |
| 111100 | Reserved | Reserved | 408 | 5 | Reserved | Reserved |
| 111101 | Reserved | Reserved | 408 | 4 | Reserved | Reserved |
| 111110 | Reserved | Reserved | 408 | 3 | Reserved | Reserved |
| 111111 | Reserved | Reserved | 408 | 2 | Reserved | Reserved |

FIG. 9

| Index | $N_{slot,k=1}$ | | $N_{slot,k=2}$ | | $N_{slot,k=4}$ | |
|---|---|---|---|---|---|---|
| | $N_{TP}$ | $N_{walsh,k}$ | $N_{TP}$ | $N_{walsh,k}$ | $N_{TP}$ | $N_{walsh,k}$ |
| 000000 | 3864 | 28 | 3864 | 27 | 3864 | 20 |
| 000001 | 3864 | 27 | 3864 | 26 | 3864 | 18 |
| 000010 | 3864 | 26 | 3864 | 23 | 3864 | 16 |
| 000011 | 3096 | 28 | 3864 | 22 | 3864 | 15 |
| 000100 | 3096 | 26 | 3864 | 21 | 3864 | 14 |
| 000101 | 3096 | 25 | 3864 | 19 | 3864 | 13 |
| 000110 | 3096 | 24 | 3864 | 18 | 3864 | 12 |
| 000111 | 3096 | 23 | 3864 | 17 | 3864 | 11 |
| 001000 | 3096 | 22 | 3864 | 16 | 3864 | 10 |
| 001001 | 3096 | 21 | 3864 | 15 | 3864 | 9 |
| 001010 | 2328 | 28 | 3864 | 14 | 3864 | 8 |
| 001011 | 2328 | 26 | 3864 | 13 | 3864 | 7 |
| 001100 | 2328 | 25 | 3096 | 28 | 3096 | 20 |
| 001101 | 2328 | 22 | 3096 | 25 | 3096 | 16 |
| 001110 | 2328 | 21 | 3096 | 23 | 3096 | 14 |
| 001111 | 2328 | 20 | 3096 | 22 | 3096 | 13 |
| 010000 | 2328 | 19 | 3096 | 21 | 3096 | 12 |
| 010001 | 2328 | 18 | 3096 | 19 | 3096 | 11 |
| 010010 | 2328 | 17 | 3096 | 17 | 3096 | 10 |
| 010011 | 2328 | 16 | 3096 | 15 | 3096 | 9 |
| 010100 | 1560 | 28 | 3096 | 14 | 3096 | 8 |
| 010101 | 1560 | 25 | 3096 | 13 | 3096 | 7 |
| 010110 | 1560 | 24 | 3096 | 12 | 3096 | 6 |
| 010111 | 1560 | 22 | 3096 | 11 | 2328 | 20 |
| 011000 | 1560 | 21 | 2328 | 24 | 2328 | 15 |
| 011001 | 1560 | 19 | 2328 | 21 | 2328 | 12 |
| 011010 | 1560 | 18 | 2328 | 19 | 2328 | 11 |
| 011011 | 1560 | 17 | 2328 | 18 | 2328 | 10 |
| 011100 | 1560 | 15 | 2328 | 17 | 2328 | 9 |
| 011101 | 1560 | 14 | 2328 | 16 | 2328 | 8 |
| 011110 | 1560 | 13 | 2328 | 14 | 2328 | 7 |
| 011111 | 1560 | 12 | 2328 | 13 | 2328 | 6 |
| 100000 | 1560 | 11 | 2328 | 11 | 2328 | 5 |
| 100001 | 792 | 28 | 2328 | 10 | 2328 | 4 |
| 100010 | 792 | 21 | 2328 | 9 | 1560 | 20 |
| 100011 | 792 | 17 | 2328 | 8 | 1560 | 14 |
| 100100 | 792 | 14 | 1560 | 27 | 1560 | 10 |
| 100101 | 792 | 13 | 1560 | 20 | 1560 | 8 |
| 100110 | 792 | 12 | 1560 | 16 | 1560 | 7 |
| 100111 | 792 | 11 | 1560 | 14 | 1560 | 6 |
| 101000 | 792 | 10 | 1560 | 13 | 1560 | 5 |
| 101001 | 792 | 9 | 1560 | 12 | 1560 | 4 |
| 101010 | 792 | 8 | 1560 | 11 | 1560 | 3 |
| 101011 | 792 | 7 | 1560 | 10 | 792 | 11 |
| 101100 | 792 | 6 | 1560 | 9 | 792 | 7 |
| 101101 | 408 | 21 | 1560 | 8 | 792 | 6 |
| 101110 | 408 | 14 | 1560 | 7 | 792 | 5 |
| 101111 | 408 | 11 | 1560 | 6 | 792 | 4 |
| 110000 | 408 | 9 | 792 | 21 | 792 | 3 |
| 110001 | 408 | 8 | 792 | 14 | 792 | 2 |
| 110010 | 408 | 7 | 792 | 11 | 408 | 6 |
| 110011 | 408 | 6 | 792 | 9 | 408 | 4 |
| 110100 | 408 | 5 | 792 | 7 | 408 | 3 |
| 110101 | 408 | 4 | 792 | 6 | 408 | 2 |
| 110110 | 408 | 3 | 792 | 5 | 408 | 1 |
| 110111 | Reserved | Reserved | 792 | 4 | Reserved | Reserved |
| 111000 | Reserved | Reserved | 792 | 3 | Reserved | Reserved |
| 111001 | Reserved | Reserved | 408 | 11 | Reserved | Reserved |
| 111010 | Reserved | Reserved | 408 | 7 | Reserved | Reserved |
| 111011 | Reserved | Reserved | 408 | 6 | Reserved | Reserved |
| 111100 | Reserved | Reserved | 408 | 5 | Reserved | Reserved |
| 111101 | Reserved | Reserved | 408 | 4 | Reserved | Reserved |
| 111110 | Reserved | Reserved | 408 | 3 | Reserved | Reserved |
| 111111 | Reserved | Reserved | 408 | 2 | Reserved | Reserved |

FIG. 10

| Index | $N_{slot,k=1}$ | | $N_{slot,k=2}$ | | $N_{slot,k=4}$ | |
|---|---|---|---|---|---|---|
| | $N_{EP}$ | $N_{walsh,k}$ | $N_{EP}$ | $N_{walsh,k}$ | $N_{EP}$ | $N_{walsh,k}$ |
| 00000 | 3864 | 26 | 3864 | 27 | 3864 | 18 |
| 00001 | 3096 | 27 | 3864 | 23 | 3864 | 14 |
| 00010 | 3096 | 24 | 3864 | 17 | 3864 | 12 |
| 00011 | 3096 | 21 | 3864 | 15 | 3864 | 9 |
| 00100 | 2328 | 27 | 3864 | 13 | 3864 | 8 |
| 00101 | 2328 | 20 | 3096 | 28 | 3864 | 7 |
| 00110 | 2328 | 19 | 3096 | 22 | 3096 | 14 |
| 00111 | 2328 | 16 | 3096 | 18 | 3096 | 11 |
| 01000 | 1560 | 28 | 3096 | 14 | 3096 | 9 |
| 01001 | 1560 | 22 | 3096 | 12 | 3096 | 7 |
| 01010 | 1560 | 19 | 3096 | 11 | 3096 | 6 |
| 01011 | 1560 | 14 | 2328 | 21 | 2328 | 20 |
| 01100 | 1560 | 13 | 2328 | 17 | 2328 | 11 |
| 01101 | 1560 | 11 | 2328 | 14 | 2328 | 9 |
| 01110 | 792 | 28 | 2328 | 10 | 2328 | 7 |
| 01111 | 792 | 15 | 2328 | 8 | 2328 | 5 |
| 10000 | 792 | 11 | 1560 | 27 | 2328 | 4 |
| 10001 | 792 | 10 | 1560 | 14 | 1560 | 14 |
| 10010 | 792 | 7 | 1560 | 11 | 1560 | 7 |
| 10011 | 792 | 6 | 1560 | 10 | 1560 | 6 |
| 10100 | 408 | 15 | 1560 | 7 | 1560 | 5 |
| 10101 | 408 | 8 | 1560 | 6 | 1560 | 4 |
| 10110 | 408 | 6 | 792 | 14 | 1560 | 3 |
| 10111 | 408 | 5 | 792 | 8 | 792 | 7 |
| 11000 | 408 | 4 | 792 | 6 | 792 | 4 |
| 11001 | 408 | 3 | 792 | 5 | 792 | 3 |
| 11010 | Reserved | Reserved | 792 | 4 | 792 | 2 |
| 11011 | Reserved | Reserved | 792 | 3 | 408 | 4 |
| 11100 | Reserved | Reserved | 408 | 8 | 408 | 2 |
| 11101 | Reserved | Reserved | 408 | 4 | 408 | 1 |
| 11110 | Reserved | Reserved | 408 | 3 | Reserved | Reserved |
| 11111 | Reserved | Reserved | 408 | 2 | Reserved | Reserved |

FIG. 11

| Index | $N_{slot,k=1}$ | | $N_{slot,k=2}$ | | $N_{slot,k=4}$ | |
|---|---|---|---|---|---|---|
| | $N_{ep}$ | $N_{walsh,k}$ | $N_{ep}$ | $N_{walsh,k}$ | $N_{ep}$ | $N_{walsh,k}$ |
| 00000 | 3864 | 28 | 3864 | 27 | 3864 | 18 |
| 00001 | 3864 | 26 | 3864 | 21 | 3864 | 14 |
| 00010 | 3096 | 26 | 3864 | 16 | 3864 | 11 |
| 00011 | 3096 | 22 | 3864 | 14 | 3864 | 8 |
| 00100 | 3096 | 21 | 3864 | 13 | 3864 | 7 |
| 00101 | 2328 | 25 | 3096 | 28 | 3096 | 14 |
| 00110 | 2328 | 20 | 3096 | 22 | 3096 | 11 |
| 00111 | 2328 | 17 | 3096 | 17 | 3096 | 9 |
| 01000 | 2328 | 16 | 3096 | 13 | 3096 | 7 |
| 01001 | 1560 | 28 | 3096 | 11 | 3096 | 6 |
| 01010 | 1560 | 22 | 2328 | 21 | 2328 | 20 |
| 01011 | 1560 | 17 | 2328 | 17 | 2328 | 11 |
| 01100 | 1560 | 13 | 2328 | 13 | 2328 | 9 |
| 01101 | 1560 | 11 | 2328 | 10 | 2328 | 7 |
| 01110 | 792 | 28 | 2328 | 9 | 2328 | 5 |
| 01111 | 792 | 15 | 2328 | 8 | 2328 | 4 |
| 10000 | 792 | 11 | 1560 | 27 | 1560 | 14 |
| 10001 | 792 | 9 | 1560 | 14 | 1560 | 7 |
| 10010 | 792 | 7 | 1560 | 11 | 1560 | 6 |
| 10011 | 792 | 6 | 1560 | 9 | 1560 | 5 |
| 10100 | 408 | 15 | 1560 | 7 | 1560 | 4 |
| 10101 | 408 | 8 | 1560 | 6 | 1560 | 3 |
| 10110 | 408 | 6 | 792 | 14 | 792 | 7 |
| 10111 | 408 | 5 | 792 | 8 | 792 | 4 |
| 11000 | 408 | 4 | 792 | 6 | 792 | 3 |
| 11001 | 408 | 3 | 792 | 5 | 792 | 2 |
| 11010 | Reserved | Reserved | 792 | 4 | 408 | 4 |
| 11011 | Reserved | Reserved | 792 | 3 | 408 | 2 |
| 11100 | Reserved | Reserved | 408 | 8 | 408 | 1 |
| 11101 | Reserved | Reserved | 408 | 4 | Reserved | Reserved |
| 11110 | Reserved | Reserved | 408 | 3 | Reserved | Reserved |
| 11111 | Reserved | Reserved | 408 | 2 | Reserved | Reserved |

FIG. 12

| Index | $N_{slot,k=1}$ | | $N_{slot,k=2}$ | | $N_{slot,k=4}$ | |
|---|---|---|---|---|---|---|
| | $N_{ep}$ | $N_{walsh,k}$ | $N_{ep}$ | $N_{walsh,k}$ | $N_{ep}$ | $N_{walsh,k}$ |
| 00000 | 3864 | 26 | 3864 | 27 | 3864 | 18 |
| 00001 | 3096 | 25 | 3864 | 21 | 3864 | 14 |
| 00010 | 3096 | 21 | 3864 | 15 | 3864 | 11 |
| 00011 | 2328 | 25 | 3864 | 13 | 3864 | 8 |
| 00100 | 2328 | 19 | 3096 | 28 | 3864 | 7 |
| 00101 | 2328 | 16 | 3096 | 22 | 3096 | 14 |
| 00110 | 1560 | 28 | 3096 | 17 | 3096 | 11 |
| 00111 | 1560 | 22 | 3096 | 13 | 3096 | 9 |
| 01000 | 1560 | 17 | 3096 | 11 | 3096 | 7 |
| 01001 | 1560 | 13 | 3096 | 21 | 3096 | 6 |
| 01010 | 1560 | 11 | 2328 | 17 | 2328 | 20 |
| 01011 | 792 | 28 | 2328 | 13 | 2328 | 11 |
| 01100 | 792 | 15 | 2328 | 10 | 2328 | 9 |
| 01101 | 792 | 11 | 2328 | 8 | 2328 | 7 |
| 01110 | 792 | 9 | 1560 | 27 | 2328 | 5 |
| 01111 | 792 | 7 | 1560 | 14 | 2328 | 4 |
| 10000 | 792 | 6 | 1560 | 11 | 1560 | 14 |
| 10001 | 408 | 15 | 1560 | 9 | 1560 | 7 |
| 10010 | 408 | 8 | 1560 | 7 | 1560 | 6 |
| 10011 | 408 | 6 | 1560 | 6 | 1560 | 5 |
| 10100 | 408 | 5 | 792 | 14 | 1560 | 4 |
| 10101 | 408 | 4 | 792 | 8 | 1560 | 3 |
| 10110 | 408 | 3 | 792 | 6 | 792 | 7 |
| 10111 | Reserved | Reserved | 792 | 5 | 792 | 4 |
| 11000 | Reserved | Reserved | 792 | 4 | 792 | 3 |
| 11001 | Reserved | Reserved | 792 | 3 | 792 | 2 |
| 11010 | Reserved | Reserved | 408 | 8 | 408 | 4 |
| 11011 | Reserved | Reserved | 408 | 4 | 408 | 2 |
| 11100 | Reserved | Reserved | 408 | 3 | 408 | 1 |
| 11101 | Reserved | Reserved | 408 | 2 | Reserved | Reserved |
| 11110 | Reserved | Reserved | Reserved | Reserved | Reserved | Reserved |
| 11111 | Reserved | Reserved | Reserved | Reserved | Reserved | Reserved |

FIG.13

| Index | $N_{slot,k=1}$ | | $N_{slot,k=2}$ | | $N_{slot,k=4}$ | |
|---|---|---|---|---|---|---|
| | $N_{EP}$ | $N_{walsh,k}$ | $N_{EP}$ | $N_{walsh,k}$ | $N_{EP}$ | $N_{walsh,k}$ |
| 00000 | 3864 | 28 | 3864 | 27 | 3864 | 18 |
| 00001 | 3864 | 26 | 3864 | 21 | 3864 | 14 |
| 00010 | 3096 | 26 | 3864 | 16 | 3864 | 11 |
| 00011 | 3096 | 22 | 3864 | 14 | 3864 | 8 |
| 00100 | 3096 | 21 | 3864 | 13 | 3864 | 7 |
| 00101 | 2328 | 25 | 3096 | 28 | 3096 | 27 |
| 00110 | 2328 | 20 | 3096 | 22 | 3096 | 14 |
| 00111 | 2328 | 17 | 3096 | 17 | 3096 | 11 |
| 01000 | 2328 | 16 | 3096 | 13 | 3096 | 9 |
| 01001 | 1560 | 28 | 3096 | 11 | 3096 | 7 |
| 01010 | 1560 | 22 | 2328 | 21 | 3096 | 6 |
| 01011 | 1560 | 17 | 2328 | 17 | 2328 | 21 |
| 01100 | 1560 | 13 | 2328 | 13 | 2328 | 11 |
| 01101 | 1560 | 11 | 2328 | 10 | 2328 | 9 |
| 01110 | 792 | 28 | 2328 | 9 | 2328 | 7 |
| 01111 | 792 | 15 | 2328 | 8 | 2328 | 5 |
| 10000 | 792 | 11 | 1560 | 28 | 2328 | 4 |
| 10001 | 792 | 9 | 1560 | 14 | 1560 | 14 |
| 10010 | 792 | 7 | 1560 | 11 | 1560 | 7 |
| 10011 | 792 | 6 | 1560 | 9 | 1560 | 6 |
| 10100 | 408 | 15 | 1560 | 7 | 1560 | 5 |
| 10101 | 408 | 8 | 1560 | 6 | 1560 | 4 |
| 10110 | 408 | 6 | 792 | 14 | 1560 | 3 |
| 10111 | 408 | 5 | 792 | 8 | 792 | 7 |
| 11000 | 408 | 4 | 792 | 6 | 792 | 4 |
| 11001 | 408 | 3 | 792 | 5 | 792 | 3 |
| 11010 | Reserved | Reserved | 792 | 4 | 792 | 2 |
| 11011 | Reserved | Reserved | 792 | 3 | 408 | 4 |
| 11100 | Reserved | Reserved | 408 | 8 | 408 | 2 |
| 11101 | Reserved | Reserved | 408 | 4 | 408 | 1 |
| 11110 | Reserved | Reserved | 408 | 3 | Reserved | Reserved |
| 11111 | Reserved | Reserved | 408 | 2 | Reserved | Reserved |

FIG.14A

| $N_{EP}$ | $N_{Walsh,k}$ | $N_{slot,k}$ | $m_k$ | $c_k$ |
|---|---|---|---|---|
| 2328 | 28 | 1 | 3 | 0.5774 |
| 3864 | 27 | 2 | 2 | 0.7454 |
| 3864 | 26 | 1 | 4 | 0.7740 |
| 3864 | 26 | 4 | 2 | 0.3870 |
| 1560 | 25 | 1 | 2 | 0.6500 |
| 2328 | 25 | 1 | 3 | 0.6467 |
| 3096 | 25 | 1 | 4 | 0.6450 |
| 3096 | 25 | 2 | 2 | 0.6450 |
| 2328 | 23 | 2 | 2 | 0.5272 |
| 3096 | 23 | 1 | 4 | 0.7011 |
| 3864 | 23 | 2 | 3 | 0.5833 |
| 1560 | 22 | 1 | 2 | 0.7386 |
| 2328 | 22 | 1 | 4 | 0.5511 |
| 3096 | 22 | 2 | 2 | 0.7330 |
| 408 | 21 | 1 | 2 | 0.2024 |
| 792 | 21 | 1 | 2 | 0.3929 |
| 792 | 21 | 2 | 2 | 0.1964 |
| 1560 | 21 | 2 | 2 | 0.3869 |
| 3096 | 21 | 1 | 4 | 0.7679 |
| 3096 | 21 | 4 | 2 | 0.3839 |
| 3864 | 21 | 2 | 3 | 0.6389 |
| 1560 | 20 | 4 | 2 | 0.2031 |
| 1560 | 19 | 1 | 3 | 0.5702 |
| 2328 | 19 | 1 | 4 | 0.6382 |
| 2328 | 19 | 2 | 2 | 0.6382 |
| 3096 | 19 | 2 | 3 | 0.5658 |
| 3864 | 19 | 4 | 2 | 0.5296 |
| 2328 | 18 | 1 | 4 | 0.6736 |
| 3864 | 18 | 2 | 4 | 0.5590 |
| 1560 | 17 | 1 | 3 | 0.6373 |
| 2328 | 17 | 2 | 2 | 0.7132 |

FIG.14B

| $N_{EP}$ | $N_{Walsh,k}$ | $N_{slot,k}$ | $m_k$ | $c_k$ |
|---|---|---|---|---|
| 3096 | 17 | 2 | 3 | 0.6324 |
| 2328 | 16 | 1 | 4 | 0.7578 |
| 2328 | 16 | 4 | 2 | 0.3789 |
| 3864 | 16 | 2 | 4 | 0.6289 |
| 3864 | 16 | 4 | 2 | 0.6289 |
| 792 | 15 | 1 | 2 | 0.5500 |
| 1560 | 15 | 1 | 4 | 0.5417 |
| 1560 | 15 | 2 | 2 | 0.5417 |
| 3096 | 15 | 2 | 4 | 0.5375 |
| 3096 | 15 | 4 | 2 | 0.5375 |
| 3864 | 15 | 2 | 4 | 0.6708 |
| 2328 | 14 | 2 | 3 | 0.5774 |
| 3864 | 14 | 4 | 2 | 0.7188 |
| 792 | 13 | 1 | 2 | 0.6346 |
| 1560 | 13 | 1 | 4 | 0.6250 |
| 1560 | 13 | 2 | 2 | 0.6250 |
| 2328 | 13 | 2 | 3 | 0.6218 |
| 3096 | 13 | 2 | 4 | 0.6202 |
| 3096 | 13 | 4 | 2 | 0.6202 |
| 3864 | 13 | 2 | 4 | 0.7740 |
| 1560 | 12 | 1 | 4 | 0.6771 |
| 2328 | 12 | 4 | 2 | 0.5052 |
| 3096 | 12 | 2 | 4 | 0.6719 |
| 3864 | 12 | 4 | 3 | 0.5590 |
| 408 | 11 | 1 | 2 | 0.3864 |
| 408 | 11 | 2 | 2 | 0.1932 |
| 792 | 11 | 1 | 2 | 0.7500 |
| 792 | 11 | 2 | 2 | 0.3750 |
| 792 | 11 | 4 | 2 | 0.1875 |
| 1560 | 11 | 1 | 4 | 0.7386 |
| 1560 | 11 | 2 | 2 | 0.7386 |
| 1560 | 11 | 4 | 2 | 0.3693 |

FIG.14C

| $N_{EP}$ | $N_{Walsh,k}$ | $N_{slot,k}$ | $m_k$ | $c_k$ |
|---|---|---|---|---|
| 2328 | 11 | 2 | 4 | 0.5511 |
| 3096 | 11 | 2 | 4 | 0.7330 |
| 3096 | 11 | 4 | 2 | 0.7330 |
| 3864 | 11 | 4 | 3 | 0.6098 |
| 792 | 10 | 1 | 3 | 0.5500 |
| 1560 | 10 | 2 | 3 | 0.5417 |
| 2328 | 10 | 2 | 4 | 0.6063 |
| 2328 | 10 | 4 | 2 | 0.6063 |
| 3096 | 10 | 4 | 3 | 0.5375 |
| 792 | 9 | 1 | 3 | 0.6111 |
| 1560 | 9 | 2 | 3 | 0.6019 |
| 2328 | 9 | 2 | 4 | 0.6736 |
| 2328 | 9 | 4 | 2 | 0.6736 |
| 3096 | 9 | 4 | 3 | 0.5972 |
| 3864 | 9 | 4 | 4 | 0.5590 |
| 408 | 8 | 1 | 2 | 0.5313 |
| 792 | 8 | 1 | 4 | 0.5156 |
| 792 | 8 | 2 | 2 | 0.5156 |
| 1560 | 8 | 2 | 4 | 0.5078 |
| 1560 | 8 | 4 | 2 | 0.5078 |
| 2328 | 8 | 2 | 4 | 0.7578 |
| 3096 | 8 | 4 | 4 | 0.5039 |
| 3864 | 8 | 4 | 4 | 0.6289 |
| 408 | 7 | 1 | 2 | 0.6071 |
| 792 | 7 | 1 | 4 | 0.5893 |
| 792 | 7 | 2 | 2 | 0.5893 |
| 1560 | 7 | 2 | 4 | 0.5804 |
| 1560 | 7 | 4 | 2 | 0.5804 |
| 2328 | 7 | 4 | 3 | 0.5774 |
| 3096 | 7 | 4 | 4 | 0.5759 |
| 3864 | 7 | 4 | 4 | 0.7188 |
| 408 | 6 | 1 | 2 | 0.7083 |

FIG.14D

| $N_{EP}$ | $N_{Walsh,k}$ | $N_{slot,k}$ | $m_k$ | $c_k$ |
|---|---|---|---|---|
| 408 | 6 | 2 | 2 | 0.3542 |
| 408 | 6 | 4 | 2 | 0.1771 |
| 792 | 6 | 1 | 4 | 0.6875 |
| 792 | 6 | 2 | 2 | 0.6875 |
| 792 | 6 | 4 | 2 | 0.3438 |
| 1560 | 6 | 2 | 4 | 0.6771 |
| 1560 | 6 | 4 | 2 | 0.6771 |
| 2328 | 6 | 4 | 4 | 0.5052 |
| 3096 | 6 | 4 | 4 | 0.6719 |
| 408 | 5 | 1 | 3 | 0.5667 |
| 792 | 5 | 2 | 3 | 0.5500 |
| 1560 | 5 | 4 | 3 | 0.5417 |
| 2328 | 5 | 4 | 4 | 0.6063 |
| 408 | 4 | 1 | 4 | 0.5313 |
| 408 | 4 | 2 | 2 | 0.5313 |
| 792 | 4 | 2 | 4 | 0.5156 |
| 792 | 4 | 4 | 2 | 0.5156 |
| 1560 | 4 | 4 | 4 | 0.5078 |
| 2328 | 4 | 4 | 4 | 0.7578 |
| 408 | 3 | 1 | 4 | 0.7083 |
| 408 | 3 | 2 | 2 | 0.7083 |
| 408 | 3 | 4 | 2 | 0.3542 |
| 792 | 3 | 2 | 4 | 0.6875 |
| 792 | 3 | 4 | 2 | 0.6875 |
| 1560 | 3 | 4 | 4 | 0.6771 |
| 408 | 2 | 2 | 4 | 0.5313 |
| 408 | 2 | 4 | 2 | 0.5313 |
| 792 | 2 | 4 | 4 | 0.5156 |
| 408 | 1 | 4 | 4 | 0.5313 |

FIG.15

| Index | $N_{slot,k}=1$ | | $N_{slot,k}=2$ | | $N_{slot,k}=4$ | |
|---|---|---|---|---|---|---|
| | $N_{zp}$ | $N_{walsh,k}$ | $N_{zp}$ | $N_{walsh,k}$ | $N_{zp}$ | $N_{walsh,k}$ |
| 000000 | 3864 | 26 | 3864 | 27 | 3864 | 26 |
| 000001 | 3096 | 25 | 3864 | 23 | 3864 | 19 |
| 000010 | 3096 | 23 | 3864 | 21 | 3864 | 16 |
| 000011 | 3096 | 21 | 3864 | 18 | 3864 | 14 |
| 000100 | 2328 | 28 | 3864 | 16 | 3864 | 12 |
| 000101 | 2328 | 25 | 3864 | 15 | 3864 | 11 |
| 000110 | 2328 | 22 | 3864 | 13 | 3864 | 9 |
| 000111 | 2328 | 19 | 3096 | 25 | 3864 | 8 |
| 001000 | 2328 | 18 | 3096 | 22 | 3864 | 7 |
| 001001 | 2328 | 16 | 3096 | 19 | 3096 | 21 |
| 001010 | 1560 | 25 | 3096 | 17 | 3096 | 15 |
| 001011 | 1560 | 22 | 3096 | 15 | 3096 | 13 |
| 001100 | 1560 | 19 | 3096 | 13 | 3096 | 11 |
| 001101 | 1560 | 17 | 3096 | 12 | 3096 | 10 |
| 001110 | 1560 | 15 | 3096 | 11 | 3096 | 9 |
| 001111 | 1560 | 13 | 2328 | 23 | 3096 | 8 |
| 010000 | 1560 | 12 | 2328 | 19 | 3096 | 7 |
| 010001 | 1560 | 11 | 2328 | 17 | 3096 | 6 |
| 010010 | 792 | 21 | 2328 | 14 | 2328 | 16 |
| 010011 | 792 | 15 | 2328 | 13 | 2328 | 12 |
| 010100 | 792 | 13 | 2328 | 11 | 2328 | 10 |
| 010101 | 792 | 11 | 2328 | 10 | 2328 | 9 |
| 010110 | 792 | 10 | 2328 | 9 | 2328 | 7 |
| 010111 | 792 | 9 | 2328 | 8 | 2328 | 6 |
| 011000 | 792 | 8 | 1560 | 21 | 2328 | 5 |
| 011001 | 792 | 7 | 1560 | 15 | 2328 | 4 |
| 011010 | 792 | 6 | 1560 | 13 | 1560 | 20 |
| 011011 | 408 | 21 | 1560 | 11 | 1560 | 11 |
| 011100 | 408 | 11 | 1560 | 10 | 1560 | 8 |
| 011101 | 408 | 8 | 1560 | 9 | 1560 | 7 |
| 011110 | 408 | 7 | 1560 | 8 | 1560 | 6 |
| 011111 | 408 | 6 | 1560 | 7 | 1560 | 5 |
| 100000 | 408 | 5 | 1560 | 6 | 1560 | 4 |
| 100001 | 408 | 4 | 792 | 21 | 1560 | 3 |
| 100010 | 408 | 3 | 792 | 11 | 792 | 11 |
| 100011 | Reserved | Reserved | 792 | 8 | 792 | 6 |
| 100100 | Reserved | Reserved | 792 | 7 | 792 | 4 |
| 100101 | Reserved | Reserved | 792 | 6 | 792 | 3 |
| 100110 | Reserved | Reserved | 792 | 5 | 792 | 2 |
| 100111 | Reserved | Reserved | 792 | 4 | 408 | 6 |
| 101000 | Reserved | Reserved | 792 | 3 | 408 | 3 |
| 101001 | Reserved | Reserved | 408 | 11 | 408 | 2 |
| 101010 | Reserved | Reserved | 408 | 6 | 408 | 1 |
| 101011 | Reserved | Reserved | 408 | 4 | Reserved | Reserved |
| 101100 | Reserved | Reserved | 408 | 3 | Reserved | Reserved |
| 101101 | Reserved | Reserved | 408 | 2 | Reserved | Reserved |
| 101110 | Reserved | Reserved | Reserved | Reserved | Reserved | Reserved |
| 101111 | Reserved | Reserved | Reserved | Reserved | Reserved | Reserved |
| 110000 | Reserved | Reserved | Reserved | Reserved | Reserved | Reserved |
| 110001 | Reserved | Reserved | Reserved | Reserved | Reserved | Reserved |
| 110010 | Reserved | Reserved | Reserved | Reserved | Reserved | Reserved |
| 110011 | Reserved | Reserved | Reserved | Reserved | Reserved | Reserved |
| 110100 | Reserved | Reserved | Reserved | Reserved | Reserved | Reserved |
| 110101 | Reserved | Reserved | Reserved | Reserved | Reserved | Reserved |
| 110110 | Reserved | Reserved | Reserved | Reserved | Reserved | Reserved |
| 110111 | Reserved | Reserved | Reserved | Reserved | Reserved | Reserved |
| 111000 | Reserved | Reserved | Reserved | Reserved | Reserved | Reserved |
| 111001 | Reserved | Reserved | Reserved | Reserved | Reserved | Reserved |
| 111010 | Reserved | Reserved | Reserved | Reserved | Reserved | Reserved |
| 111011 | Reserved | Reserved | Reserved | Reserved | Reserved | Reserved |
| 111100 | Reserved | Reserved | Reserved | Reserved | Reserved | Reserved |
| 111101 | Reserved | Reserved | Reserved | Reserved | Reserved | Reserved |
| 111110 | Reserved | Reserved | Reserved | Reserved | Reserved | Reserved |
| 111111 | Reserved | Reserved | Reserved | Reserved | Reserved | Reserved |

DETERMINING USEABLE COMBINATIONS OF VARIABLES FOR TRANSMITTING A SUBPACKET OF AN ENCODER PACKET

CROSS-REFERENCE TO RELATED APPLICATIONS

This application claims the benefit of Korean Patent Application No. P2002-23840 filed on Apr. 30, 2002, Korean Patent Application No P2002-24627 filed on May 4, 2002, Korean Patent Application No. P2002-26003 filed on May 11, 2002, and Korean Patent Application No. P2002-28526 filed on May 22, 2002, all of which are hereby incorporated by reference as if fully set forth herein.

BACKGROUND OF THE INVENTION

Field of the Invention

The present invention relates to method of transmitting data in a communication system, and more particularly, to a method of determining useable combinations of variables for transmitting a subpacket of an encoder packet in a communication system.

A set of variables used for the packet transmission in an existing CDMA mobile communication system are:

k which represents an index of a subpacket of an encoder packet;

$N_{EP}$ which represents the number of data bits included in an encoder packet;

$N_{Walsh, k}$ which represents the number of currently useable Walsh codes for transmitting a kth subpacket;

$m_k$ which represents a modulation order for a kth subpacket;

$c_k$ which represents a code rate for a kth subpacket;

$N_{slot, k}$ which represents the number of useable slots for transmitting a kth subpacket;

and $MPR_k$ which represents a Modulation order Product code Rate for a kth subpacket.

In general, an encoder packet refers to a transmission unit made up of input bits of an error correction encoder during packet transmission and the number of input bits is $N_{EP}$. An encoder packet includes one or more subpackets.

In a case where an encoder packet includes more than one subpacket, the first subpacket is always transmitted, and a next subpacket gets transmitted only when the receiving party makes a subpacket transmission request if it fails to receive the first subpacket. The subpackets of an encoder packet that are transmitted to the receiving party are distinguished by subpacket index k and can have different $c_k$, $N_{slot, k}$, $MPR_K$ values.

$m_k$, which represents a modulation order for a kth subpacket, is denoted as 2, 3, 4, 5, and 6 for QPSK, 8-PSK, 16-QAM, and 32-QAM, 64-QAM, respectively. A slot refers to a transmission unit that has a fixed length of time and it is assumed to be 1.25 msec in the following section.

In addition, assuming that the Walsh codes mentioned earlier are composed of r number of identical chips and the chip transmission rate is y Hz, $MPR_k$ can be defined by the following equation.

$$MPR_k = \frac{N_{EP}}{(y \cdot 1.25 \cdot 10^{-3}/r) \cdot N_{Walsh,k} \cdot N_{slot,k}}$$

Equation 1

Alternatively, $MPR_k$ can be defined by the following equation.

$$MPR_k = m \cdot c_k$$

Equation 2

If y=1,228,800 Hz and r=32 (chip), Equation 1 can be simplified as Equation 3 (hereinafter, it will be assumed that y=1,228,800 Hz and r=32. However, the present invention is not limited to particular values for y and r).

$$MPR_k = \frac{N_{EP}}{48 \cdot N_{Walsh,k} \cdot N_{slot,k}}$$

Equation 3

Among many combinations of the values of $N_{Walsh,k}$, $N_{slot,k}$, $m_k$, and $N_{EP}$, the transmitting party selects an appropriate one of the combinations when sending a subpacket. An exception applies to some of the inappropriate combinations included in the combinations, and therefore, those are excluded under a specified rule. An example of such rule that is currently being used is Equations 4 and 5.

$$0 < c_k < 1$$

Equation 4

$$m_k = \begin{cases} 2, \text{ if } 0 < MPR_k \leq 1.5 \\ 3, \text{ if } 1.5 < MPR_k \leq 2 \\ 4, \text{ if } 2 < MPR_k \leq 3.2 \end{cases}$$

Equation 5

FIGS. 2, 3, and 4 are examples that show the combinations of the variables that satisfy Equations 4 and 5. The values of $MRP_K$ shown in the figures and in the examples are the approximate values, and exact values should be used in actual calculations. First, FIG. 2 shows the possible combinations of transmission variables used by the transmission party in the packet transmission when $N_{EP}$=3864 and $N_{slot,k}$=4. Similarly, FIG. 3 and FIG. 4 shows the possible combinations of the variables when $N_{EP}$=3864, $N_{slot,k}$=2 and $N_{EP}$=3864, $N_{slot,k}$=1, respectively.

Hereinafter, all combinations of transmission variables that the transmitting party can use when transmitting a subpacket will be referred to as 'transmission_method_combination_ALL.' Namely, the combinations of transmission variables that appear in FIG. 2, FIG. 3, and FIG. 4 show some of the elements of 'transmission_method_combination_ALL'.

In the prior art described above, there are an infinite number of combinations of transmission variables that can be used in packet transmission as the variables $N_{Walsh, k}$, $N_{slot, k}$, $m_k$, $N_{EP}$ can have various values. In such case, the following problems occur. First, the transmitting or receiving party (e.g., a base station and a mobile station) must have a memory that stores all combinations of the transmission variables (i.e., 'transmission_method_combination_ALL), and this generate the problem of unnecessary memory use. This indicates that the memory also stores those combinations of the transmission variables that are never used, and this creates a great memory loss.

SUMMARY OF THE INVENTION

An object of the present invention is to provide to a method of determining useable combinations of variables for transmitting a subpacket of an encoder packet in a communication system to increase the packet transmission efficiency of the transmitting and receiving parties.

Another object of the present invention is to provide a method of selecting useable combinations of variables from all combinations of the transmission variables for transmitting a subpacket of an encoder packet in a communication system.

In a first aspect of the present invention, a method of determining useable combinations of variables includes the steps of setting a plurality of all combinations of transmission variables for transmitting a subpacket of an encoder packet; defining a plurality of predetermined sets of modulation order product code rates (MPR), each predetermined MPR set corresponding to each combination of a set of numbers of useable encoder packet bits and a set of numbers of useable slots; and selecting an arbitrary combination of transmission variables from the plurality of all combinations based on a number of currently useable Walsh codes and channel environment.

The method further includes the steps of determining an arbitrary MPR based on a number of useable encoder packet bits, a number of useable slots, and the number of currently useable Walsh codes that belong to the selected arbitrary combination of transmission variables; selecting one of the plurality of predetermined MPR sets that corresponds to the number of useable encoder packet bits and the number of useable slots and determining a smallest one of MPR values of the selected MPR set that are greater or identical to the arbitrary MPR as a final MPR; calculating a final number of Walsh codes based on the number of useable encoder packet bits, the number of useable slots, and the determined final MPR; and determining useable combinations of transmission variables from the plurality of all combinations of transmission variables based on the set of numbers of useable encoder packet bits, the set of numbers of useable slots, and the final number of Walsh codes.

In addition, the method according to the first aspect of the present invention may further include the steps of assigning an index to each of the useable combinations of transmission variables; storing the index-assigned useable combinations of transmission variables in a memory; selecting one of the useable combinations of transmission variables; and transmitting a final index that corresponds to the selected useable combination to a receiving party through a physical channel.

In a second aspect of the present invention, a method of determining useable combinations of variables includes the steps of setting a plurality of all combinations of transmission variables for transmitting a subpacket of an encoder packet; defining a plurality of predetermined sets of modulation order product code rates (MPR), each predetermined MPR set corresponding to each combination of a set of numbers of useable encoder packet bits and a set of numbers of useable slots; and selecting an arbitrary combination of transmission variables from the plurality of all combinations based on a number of currently useable Walsh codes and channel environment.

The method further includes the steps of determining an arbitrary MPR based on a number of useable encoder packet bits, a number of useable slots, and the number of currently useable Walsh codes that belong to the selected arbitrary combination of transmission variables; if the arbitrary MPR is less than a threshold MPR value, selecting one of the plurality of predetermined MPR sets that corresponds to the number of useable encoder packet bits and the number of useable slots and determining a smallest one of MPR values of the selected MPR set that are greater or identical to the arbitrary MPR as a final MPR; if the arbitrary MPR is greater or equal to the threshold MPR value, determining the arbitrary MPR as the final MPR; calculating a final number of Walsh codes based on the number of useable encoder packet bits, the number of useable slots, and the determined final MPR; and determining useable combinations of transmission variables from the plurality of all combinations of transmission variables based on the set of numbers of useable encoder packet bits, the set of numbers of useable slots, and the final number of Walsh codes.

In addition, the method according to the second aspect of the present invention may further include the steps of assigning an index to each of the useable combinations of transmission variables; storing the index-assigned useable combinations of transmission variables in a memory; selecting one of the useable combinations of transmission variables; and transmitting a final index that corresponds to the selected useable combination to a receiving party through a physical channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 2 is a table that shows the possible combinations of transmission variables when $N_{EP}$=3864, $N_{slot, k}$=4;

FIG. 3 is a table that shows the possible combinations of transmission variables when $N_{EP}$=3864, $N_{slot, k}$=2;

FIG. 4 is a table that shows the possible, combinations of transmission variables when $N_{EP}$=3864, $N_{slot, k}$=1;

FIG. 5 is a table that shows the possible combinations of transmission variables when $N_{EP}$=3864;

FIG. 6 is a table that shows the possible combinations of transmission variables when $$N_{EP} = N_{EP}^6 = 3864, N_{slot,k} = N_{slot,k}^3 = 4;$$

FIG. 7 is a table that shows "transmission_method_combination_PART" obtained in Embodiment 5 and indexes assigned to the combinations of variables;

FIG. 8 is a table that shows "transmission_method_combination_PART" obtained in Embodiment 6 and indexes assigned to the combinations of variables;

FIG. 9 is a table that shows "transmission_method_combination_PART" obtained in Embodiment 7 and indexes assigned to the combinations of variables;

FIG. 10 is a table that shows "transmission_method_combination_PART" obtained in Embodiment 8 and indexes assigned to the combinations of variables;

FIG. 11 is a table that shows "transmission_method_combination_PART" obtained in Embodiment 9 and indexes assigned to the combinations of variables;

FIG. 12 is a table that shows "transmission_method_combination_PART" obtained in Embodiment 10 and indexes assigned to the combinations of variables;

FIG. 13 is a table that shows "transmission_method_combination_PART" obtained in Embodiment 11 and indexes assigned to the combinations of variables;

FIGS. 14A to 14D show "transmission_method_combination_PART" obtained in Embodiment 12; and FIG. 15 is a table that shows "transmission_method_combination_PART" obtained in Embodiment 12 and indexes assigned to the combinations of variables.

DETAILED DESCRIPTION OF THE INVENTION

Figure 1:
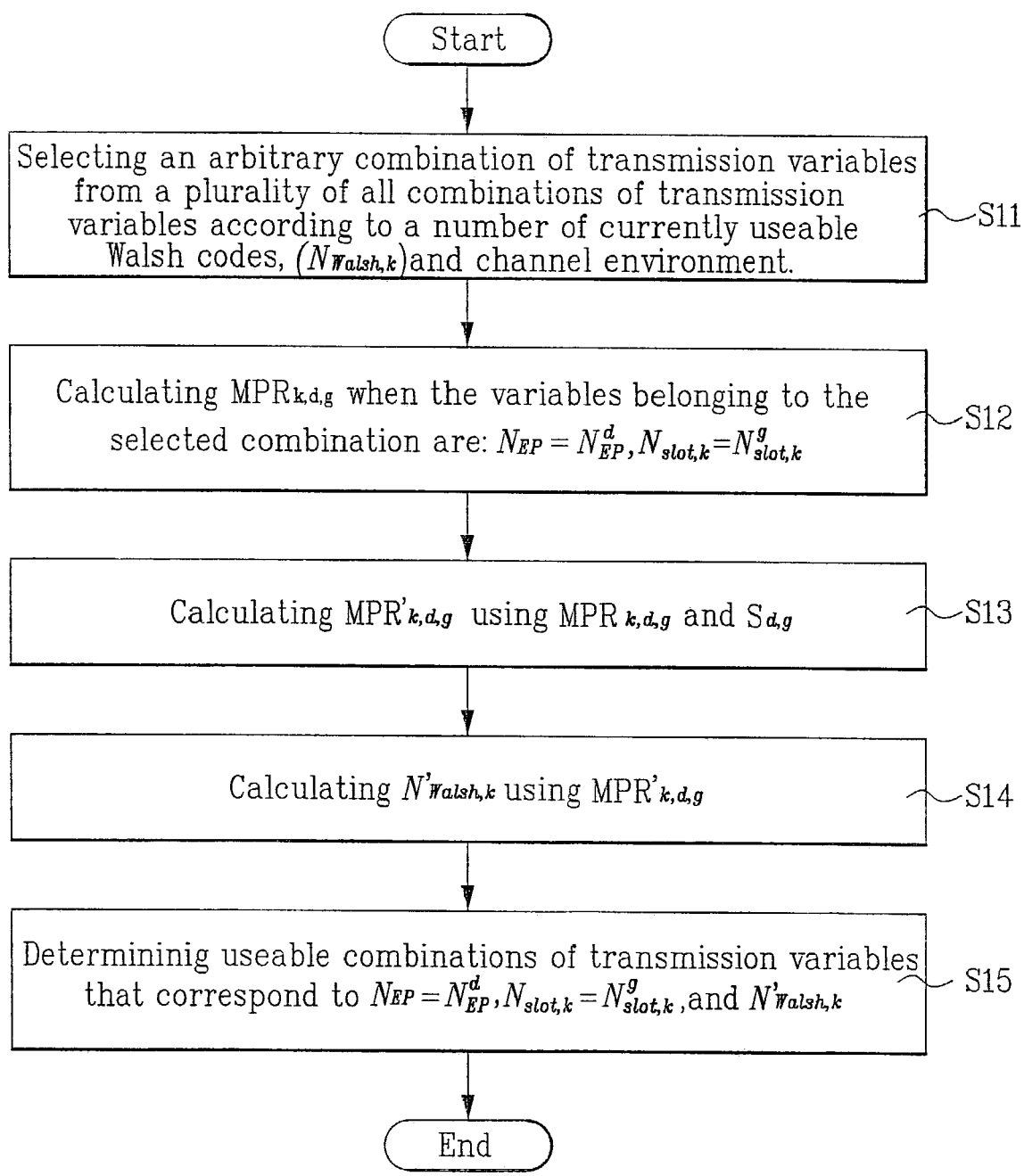
FIG. 1 is a flow chart illustrating a method of determining useable combinations of variables for transmitting a subpacket according to the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, in order to increase the efficiency of packet transmitting and receiving parties, $N_{EP}$, $N_{Walsh,k}$, and $N_{slot,k}$ are defined by the following equations.

$$N_{EP} \in \{N_{EP}^1, N_{EP}^2, \ldots, N_{EP}^d, \ldots, N_{EP}^D\} \qquad \text{Equation 6}$$

$$0 < N_{Walsh,k} \le N_{Walsh,k}^{\max} \qquad \text{Equation 7}$$

$$N_{slot,k} \in \{N_{slot,k}^1, N_{slot,k}^2, \ldots N_{slot,k}^g, \ldots, N_{slot,k}^G\} \qquad \text{Equation 8}$$

Namely, the possible value of $N_{EP}$ is any one of D number of natural numbers that belongs to $$\{N_{EP}^1, N_{EP}^2, \ldots, N_{EP}^d, \ldots, N_{EP}^D\},$$

and the value of $N_{Walsh,k}$ is any natural number that is greater than zero and either equal to or less than $$N_{Walsh,k}^{\max}.$$

In addition, the value of $N_{slot,k}$ is any one of G number of natural numbers that belong to $$N_{slot,k} \in \{N_{slot,k}^1, N_{slot,k}^2, \ldots N_{slot,k}^g, \ldots, N_{slot,k}^G\}.$$

If the number of currently useable Walsh codes is $N_{Walsh,k}$ and $MPR_{k,d,g}$ represents the value of $MPR_k$ that belongs to a combination of transmission variables of $$N_{EP} = N_{EP}^d, N_{slot,k} = N_{slot,k}^g$$

is, then $MPR_{k,d,g}$ can be defined by the following equation which is deduced from Equation 3.

$$MPR_{k,d,g} = \frac{N_{EP}^d}{48 \cdot N_{Walsh,k} \cdot N_{slot,k}^g} \qquad \text{Equation 9}$$

Then, a new variable $N'_{Walsh,k}$, which represents the number of Walsh codes needed to transmit a kth subpacket of an encoder packet is, can be defined by any one of the following equations.

$$N'_{Walsh,k} = \left\lceil \frac{N_{EP}^d}{48 \cdot MPR'_{k,d,g} \cdot N_{slot,k}^g} \right\rceil \qquad \text{Equation 10}$$

$$N'_{Walsh,k} = \max\left(\left\lceil \frac{N_{EP}^d}{48 \cdot MPR'_{k,d,g} \cdot N_{slot,k}^g} \right\rceil, N_{Walsh,k,d,g}^{\min}\right) \qquad \text{Equation 11}$$

where, $\lceil A \rceil$ represents a smallest value of integral numbers that are greater than or equal to A, and max(B, C) represents one of B and C that is greater than or equal to the other.

In addition, $$N_{Walsh,k,d,g}^{\min}$$

of Equation 11 refers to the smallest value of the $N_{Walsh,k}$ values of the combinations of transmission variables that correspond to $$N_{EP} = N_{EP}^d, N_{slot,k} = N_{slot,k}^g.$$

And the value of $MPR'_{k,d,g}$ shown in Equation 10 is determined by Definition 1 or 2 stated below.

[Definition 1]

$MPR'_{k,d,g}$ represents the smallest value of the elements of set $S_{d,g}$ shown in Equation 12 that are greater than or equal to $MPR_{k,d,g}$.

[Definition 2]

(1) If $$MPR_{k,d,g} < MPR_{k,d,g}^{Limit}, MPR'_{k,d,g}$$

represents the smallest value of the elements of set $S_{d,g}$ that are greater than or equal to $MPR_{k,d,g}$.

(2) If $$MPR'_{k,d,g} \ge MPR_{k,d,g}^{Limit}, MPR'_{k,d,g} = MPR_{k,d,g}.$$

In Definition 2, $$MPR_{k,d,g}^{Limit}$$

represents a prescribed real number and is responsible for the selection of certain combinations of transmission variables belonging to the 'transmission_method_combination_ALL' in the present invention.

Meanwhile, the set $S_{d,g}$ shown in the above definitions is defined by $$S_{d,g} = \{f_{d,g}^1, f_{d,g}^2, \ldots f_{d,g}^h, \ldots, f_{d,g}^{H_{d,g}}\}. \quad \text{Equation 12}$$

In Equation 12, the number of elements of the set $S_{d,g}$ is $H_{d,g}$ and their values are defined by $$f_{d,g}^1 < f_{d,g}^2 < \ldots < f_{d,g}^g < \ldots < f_{d,g}^{H_{d,g}}. \quad \text{Equation 13}$$

$S_{d,g}$ is defined according to each combination $$N_{EP}^d \text{ and } N_{slot,k}^g$$

and the $S_{d,g}$ elements that belong to all or come combinations of $$N_{EP}^d \text{ and } N_{slot,k}^g$$

can be equivalent.

Based on the equations above, only those of the all combinations of transmission variables which use $N'_{Walsh,k}$ number of Walsh codes and correspond to $$N_{EP} = N_{EP}^d, N_{slot,k} = N_{slot,k}^g$$

are selected. Here, an important point is the fact that those useable combinations of the variables that are selected by using the proposed equations in the present invention are only a partial set of 'transmission_method_combination_ALL.'. Hereinafter, those useable combinations of the transmission variables, which are selected by the above equations, will be referred to as 'transmission_method_combination_PART'.

Based on the explanation described above, FIG. 1 illustrates a method of selecting useable combinations of transmission variables for the transmission of a kth subpacket of an encoder packet. In this case, it is assumed that both of the transmitting and receiving parties already know the predefined $S_{d,g}$ in relation to each combination of $$N_{EP}^d$$

and $$N_{slot,k}^g.$$

Meanwhile, if one of the useable combinations of transmission variables is selected, the transmitting party transmits a subpacket according to the selected combination of transmission variables and it must notify the receiving party of the selected combination of the variables.

In general, the transmission party notifies the receiving party of the selected variables through a Physical channel that mainly transmits control information. This channel is referred to as a packet data control channel (PDCCH). In the present invention, the variable selection information is not directly transmitted to the receiving party through the PDCCH, but rather only an index, which is assigned to the selected combination of variables, is transmitted. In the present invention, this is possible because the number of 'transmission_method_combination_PART', which represents the useable combinations of the variables, is much less than that of 'transmission_method_combination_ALL.' Such indexes are called 'combinations of transmission variables index' hereinafter.

Meanwhile, in order to reduce the difficulty in implementing the hardware in the receiver part, some of 'transmission_method_combination_PART' with the number of transmission symbols greater than or equal to a predefined value (hereinafter "$L_{max}$") may be eliminated. In this case, the equation for calculating a final number of Walsh codes $N'_{Walsh,k}$ can be obtained by $$N'_{Walsh,k} = \min\left(\left\lceil \frac{N_{EP}^d}{48 \cdot MPR'_{k,d,g} \cdot N_{slot,k}^g} \right\rceil, \left\lfloor \frac{L_{max}}{48 \cdot N_{slot,k}^g \cdot m_{k,d,g}} \right\rfloor\right). \quad \text{Equation 14}$$

where, $\lceil A \rceil$ represents a smallest value of integral numbers that are greater than or equal to A and min(B, C) represents one of B and C that is less than or equal to the other. Also, $m_{k,d,g}$ of Equation 14 refers to the value of $m_k$ when $$N_{EP} = N_{EP}^d, N_{slot,k} = N_{slot,k}^g.$$

Embodiment 1

Embodiment 1 will be explained under the conditions by the following equations 15 to 18.

$$N_{EP} \in \{408, 792, 1560, 2328, 3096, 3864\} \quad \text{Equation 15}$$

$$N_{Walsh,k}^{max} = 28 \quad \text{Equation 16}$$

$N_{slot,k} \in \{1, 2, 4\}$   Equation 17

$S = \{0.1, 0.35, 0.6, 0.82, 1.02, 1.1, 1.3, 1.41, 1.5, 1.55, 1.7,$   Equation 18
$1.8, 1.9, 2, 2.1, 2.35, 2.5, 2.65, 2.8, 2.9, 3.0, 3.1, 3.2\}$ In Equation 15, it is assumed that $D = 6, N_{EP}^1 = 408, N_{EP}^2 = 792,$
$N_{EP}^3 = 1560, N_{EP}^4 = 2328, N_{EP}^5 = 3096, N_{EP}^6 = 3864.$ In Equation 17, it is assumed that $G = 3, N_{slot,k}^1 = 1, N_{slot,k}^2 = 2, N_{slot,k}^3 = 4.$ $S_{d,g}$ values are all identical and it is assumed to be S of Equation 18.

In accordance with the above-assumptions, all combinations of transmission variables 'transmission_method_combination_ALL' that satisfy Equation 4 and Equation 5 are determined.

FIG. 5 is a table showing the possible combinations of transmission variables 'transmission_method_combination_ALL' where $N_{EP}$=3864.

Hereinafter, it will be explained to determine useable combinations of transmission variables referring to FIG. 1.

An arbitrary combination of transmission variables is first selected from all the combinations of transmission variables 'transmission_method_combination_ALL' as shown in FIG. 5 based on a number of currently useable Walsh codes $N_{Walsh,k}$ and current channel environment. It is assumed that the number of currently useable Walsh codes $N_{Walsh,k}$ is 17. The selected combination is determined from FIG. 5 that $N_{EP} = N_{EP}^6 = 3864, N_{slot,k} = N_{slot,k}^3 = 4 (S11).$ Herein, the value of $MPR_{k,6,3}$ calculated by Equation 9 is 1.1838 (S12).

In accordance with the value of $MPR_{k,6,3}$, Definition 1 and S, the value of $MPR'_{k,6,3}$ is calculated to be 1.3 which is a smallest one of S elements that are greater or identical to the value of $MPR_{k,6,3}$,1.1838. $N'_{Walsh,k}$ then becomes 16 using Equation 10 (S14). As a result, the final combination of transmission variables that satisfies $N_{EP} = N_{EP}^6 = 3864, N_{slot,k} = N_{slot,k}^3 = 4$ and $N'_{Walsh,k}$=16 is indicated in FIG. 5.

Embodiment 2

In Embodiment 2, the condition of Equations 15 to 18 and the following Equation 19.

$MPR_{k,6,2}^{Limit} = 1.5$   Equation 19

Hereinafter, it will be explained to determine a combination of transmission variables in accordance with Embodiment 2.

An arbitrary combination of transmission variables is first selected from all the combinations of transmission variables 'transmission_method_combination_ALL' based on a number of currently useable Walsh codes $N_{Walsh,k}$ and current channel environment. It is assumed that the number of currently useable Walsh codes $N_{Walsh,k}$ is 26. The selected arbitrary combination is determined from FIG. 5 such that $N_{EP} = N_{EP}^6 = 3864, N_{slot,k} = N_{slot,k}^2 = 2 (S11).$ Herein, the value of $MPR_{k,6,2}$ calculated by Equation 9 is 1.5481 (S12).

In accordance with the value of $MPR_{k,6,2}$, Definition 2 and S, the value of $MPR'_{k,6,2}$ is calculated to be 1.5481 same as the value of $MPR_{k,6,2}$ (S13). $N'_{Walsh,k}$ then becomes 16 using Equation 26 (S14). As a result, the final combination of transmission variables that satisfies $N_{EP} = N_{EP}^6 = 3864, N_{slot,k} = N_{slot,k}^2 = 2$ and $N'_{Walsh,k}$=26 is selected.

Embodiment 2 shows that the initially selected combination is identical to the final combination if $m_k$ is greater than 3.

Embodiment 3

In Embodiment 3, the conditions of Equations 15-18 and the following Equation 20.

$MPR_{k,6,2}^{Limit} = 2$   Equation 20

Hereinafter, it will be explained to determine a combination of transmission variables in accordance with Embodiment 3.

An arbitrary combination of transmission variables is first selected from all the combinations of transmission variables 'transmission_method_combination_ALL' based on a number of currently useable Walsh codes $N_{Walsh,k}$ and current channel environment. It is assumed that the number of currently useable Walsh codes $N_{Walsh,k}$ is 14. The selected arbitrary combination is determined from FIG. 5 such that $N_{EP} = N_{EP}^6 = 3864, N_{slot,k} = N_{slot,k}^2 = 2 (S11).$ Herein, the value of $MPR_{k,6,2}$ calculated by Equation 9 is 2.8750 (S12).

In accordance with the value of $MPR_{k,6,2}$ Definition 2 and S, the value of $MPR'_{k,6,2}$ is calculated to be 2.8750 same as the value of $MPR_{k,6,2}$ (S13). $N'_{Walsh,k}$ then becomes 14 using Equation 10 (S14). As a result, the final combination of transmission variables that satisfies $$N_{EP} = N_{EP}^6 = 3864, N_{slot,k} = N_{slot,k}^2 = 2$$

and N'$_{Walsh,k}$=14 is selected.

Embodiment 3 shows that the initially selected combination is identical to the final combination if $m_k$ is greater than 4.

Embodiment 4

Embodiment 4 will be explained under the conditions by Equations 15-17 and the following equation.

$$S_{1,1} = \{0.1, 0.35, 0.6, 0.82, 1.02, 1.18, 1.3, 1.41, 1.5, 1.55, 1.77, 1.9, 2.0, 2.21, 2.35, 2.5, 2.65, 2.8, 2.9, 3.0, 3.1, 3.2\} \quad \text{Equation 21}$$

In Equation 15, it is assumed that $$D = 6, N_{EP}^1 = 408, N_{EP}^2 = 792, N_{EP}^3 = 1560, N_{EP}^4 = 2328, N_{EP}^5 = 3096, N_{EP}^6 = 3864.$$

In Equation 17, it is assumed that $$G = 3, N_{slot,k}^1 = 1, N_{slot,k}^2 = 2, N_{slot,k}^3 = 4.$$

$S_{d,g}$ values are all identical and it is assumed to be $S_{1,1}$ of Equation 21.

In accordance with the above-assumptions, all combinations of transmission variables 'transmission_method_combination_ALL' that satisfy Equation 4 and Equation 5 are determined.

Hereinafter, it will be explained to determine a useable combination of transmission variables referring to FIG. 1.

An arbitrary combination of transmission variables is first selected from all the combinations of transmission variables 'transmission_method_combination_ALL' as shown in FIG. 6. based on a number of currently useable Walsh codes $N_{Walsh,k}$ and current channel environment. It is assumed that the number of currently useable Walsh codes $N_{Walsh,k}$ is 23. The selected combination is determined from FIG. 6 that $$N_{EP} = N_{EP}^6 = 3864, N_{slot,k} = N_{slot,k}^3 = 4 \quad (S11).$$

Herein, the value of MPR$_{k,6,3}$ calculated by Equation 9 is 0.8750 (S12).

In accordance with the value of MPR$_{k,6,3}$, Definition 1 and S, the value of MPR'$_{k,6,3}$ is calculated to be 1.02 which is a smallest one of S elements that are greater or identical to the value of MPR$_{k,6,3}$, 0.8750. N'$_{Walsh,k}$ then becomes 20 using Equation 10 (S14). As a result, the final combination of transmission variables that satisfies $$N_{EP} = N_{EP}^6 = 3864, N_{slot,k} = N_{slot,k}^3 = 4$$

and N'$_{Walsh,k}$=20 is indicated in FIG. 5.

Embodiment 5

FIG. 7 is a table showing a result of Embodiment 5. FIG. 7 shows useable combinations of transmission variables 'transmission_method_combination_PART' and an index assigned to each useable combination.

Herein, the index is represented as a binary number and must include 6 bits when being transmitted through PDCCH.

Since the values of MPR$_k$, $m_k$, $c_k$ are calculated by the values of $N_{EP}$, $N_{slot,k}$, $N_{Walsh,k}$, FIG. 7 shows the elements of the useable combinations "transmission_method_combination_PART" to the values of $N_{EP}$, $N_{slot,k}$, $N_{Walsh,k}$.

In FIG. 7, there are three combinations of transmission variables for each index. After the receiver receives an index through PDCCH, it selects one of the three combinations of transmission variables that belong to the received index based on the length of transmission time of PDCCH.

In case of CDMA4A 2000 Revision C, for example, there may be three different transmission times of PDCCH to three different $N_{slot,k}$ values. The receiver determines $N_{slot,k}$ based on the length of transmission time of PDCCH. Afterwards, the receiver finally selects a combination of transmission variables that corresponds to the determined $N_{slot,k}$. The word 'reserved' in FIG. 7 means that certain combinations of transmission variables can be added later on.

Embodiment 6

In Embodiment 6, Equations 15 to 17 are also assumed as described below.

Namely, Equation 15 is NEP∈{408,792,1560,2328,3096,3864} and Equation 16 is $$N_{Walsh,k}^{\max} = 28.$$

Equation 17 is $N_{slot,k}$∈{1, 2, 4}.

In accordance with the above-assumptions, all $S_{d,g}$ values can be represented by the following Equations.

$S_{1,1} = S_{1,2} = S_{1,3} = \{0.35, 0.6, 0.82, 1.02, 1.18, 1.3, 1.41, 1.5, 1.55,$ Equation 22
$1.77, 1.9, 2.0, 2.21, 2.35, 2.5, 2.65, 2.8, 2.9, 3.0, 3.1, 3.2\}$ $S_{2,1} = S_{2,2} = S_{2,3} = \{0.41, 0.61, 0.82, 1.02, 1.18, 1.3, 1.41, 1.5, 1.55,$ Equation 23
$1.77, 1.9, 2.0, 2.21, 2.35, 2.5, 2.65, 2.8, 2.9, 3.0, 3.1, 3.2\}$ $S_{3,1} = S_{3,2} = S_{3,3} = \{0.41, 0.61, 0.82, 1.02, 1.18, 1.3, 1.41, 1.5, 1.55,$ Equation 24
$1.77, 1.9, 2.0, 2.21, 2.35, 2.5, 2.65, 2.8, 2.9, 3.0, 3.1, 3.2\}$ $S_{4,1} = S_{4,2} = S_{4,3} = \{0.61, 0.82, 1.02, 1.18, 1.3, 1.41, 1.5, 1.55,$ Equation 25
$1.77, 1.9, 2.0, 2.21, 2.35, 2.5, 2.65, 2.8, 2.9, 3.0, 3.1, 3.2\}$ $S_{5,1} = S_{5,2} = S_{5,3} = \{0.82, 1.02, 1.18, 1.3, 1.41, 1.5, 1.55,$ Equation 26
$1.77, 1.9, 2.0, 2.21, 2.35, 2.5, 2.65, 2.8, 2.9, 3.0, 3.1, 3.2\}$ $S_{6,1} = S_{6,2} = S_{6,3} = \{1.02, 1.18, 1.3, 1.41, 1.5, 1.55,$ Equation 27
$1.77, 1.9, 2.0, 2.21, 2.35, 2.5, 2.65, 2.8, 2.9, 3.0, 3.1, 3.2\}$ In Equation 15, it is assumed that D=6, $N_{EP}^1 = 408, N_{EP}^2 = 792, N_{EP}^3 = 1560,$ $N_{EP}^4 = 2328, N_{EP}^5 = 3096, N_{EP}^6 = 3864.$ In Equation 17, it is assumed that $G = 3, N_{slot,k}^1 = 1, N_{slot,k}^2 = 2, N_{slot,k}^3 = 4.$ In addition, Definition 1 and Equation 10 are used to calculate a final number of Walsh codes $N'_{Walsh,k}$. In accordance with the above-assumptions, all combinations of transmission variables 'transmission_method_combination_ALL' that satisfies Equations 4 and 5 are determined.

FIG. 8 is a table showing a result in accordance with Embodiment 6. Useable combinations of transmission variables 'transmission_method_combination_PART' which is a partial set of all combinations of transmission variables are selected by Embodiment 6. An index 'transmission method combination index' is assigned to each of the useable combinations of transmission variables 'transmission_method_combination_PART'.

Embodiment 7

In Embodiment 7, Equations 15 to 17 are also assumed as described below.
Namely, Equation 15 is
$N_{EP} \in \{408,792,1560,2328,3096,3864\}$ and
Equation 16 is $N_{Walsh,k}^{max} = 28.$ Equation 17 is $N_{slot,k} \in \{1, 2, 4\}$.
In accordance with the above-assumptions, $S_{1,1}$ values can be represented by the following Equation.

$S_{1,1} = \{0.41, 0.61, 0.82, 1.02, 1.18, 1.3, 1.41, 1.5, 1.55,$ Equation 28

-continued
$1.77, 1.9, 2.0, 2.21, 2.35, 2.5, 2.65, 2.8, 2.9, 3.0, 3.1, 3.2\}$

In Equation 15, it is assumed that $D = 6, N_{EP}^1 = 408, N_{EP}^2 = 792, N_{EP}^3 = 1560,$ $N_{EP}^4 = 2328, N_{EP}^5 = 3096, N_{EP}^6 = 3864.$ In Equation 17, it is assumed that $G = 3, N_{slot,k}^1 = 1, N_{slot,k}^2 = 2, N_{slot,k}^3 = 4.$ It is also assumed that all $S_{d,g}$ values are identical to S1,1. Definition 1 and Equation 14 are also used to calculate the final number of Walsh codes $N'_{Walsh,k}$. Herein, it is assumed that the value of Lmax in Equation 14 is 7728.

In accordance with the above-assumptions, all combinations of transmission variables 'transmission_method_combination_ALL' that satisfy Equation 4 and Equation 5 are determined.

FIG. 9 is a table showing a result of Embodiment 7. Useable combinations of transmission variables 'transmission_method_combination_PART' which is a partial set of all combinations of transmission variables are selected by Embodiment 7. An index 'transmission method combination index' is assigned to each of the useable combinations of transmission variables 'transmission_method_combination_PART'.

Embodiment 8

In Embodiment 8, Equations 15-17 are also assumed as described below.
Namely, Equation 15 is $N_{EP} \in \{408,792,1560,2328,3096,3864\}$ and Equation 16 is $$N_{Walsh,k}^{\max} = 28.$$

Equation 17 is $N_{slot,k} \in \{1, 2, 4\}$.

$S_{1,1}$ values can be represented by the following Equation.

$S_{1,1} = \{0.607, 1.175, 1.5, 1.8, 2.43, 2.688, 3.2\}$     Equation 29

In Equation 15, it is assumed that $$D = 6, N_{EP}^1 = 408, N_{EP}^2 =$$
$$792, N_{EP}^3 = 1560, N_{EP}^4 = 2328, N_{EP}^5 = 3096, N_{EP}^6 = 3864.$$

In Equation 17, it is assumed that $$G = 3, N_{slot,k}^1 = 1, N_{slot,k}^2 = 2, N_{slot,k}^3 = 4.$$

It is assumed that all $S_{d,g}$ values are identical to $S_{1,1}$. Definition 1 and Equation 14 are also used to calculate the final number of Walsh codes $N'_{Walsh,k}$.

Here, it is assumed that the value of Lmax of Equation 14 is 7728.

In accordance with the above-assumptions, all combinations of transmission variables 'transmission_method_combination_ALL' that satisfies equation 4 and equation 5 are determined.

FIG. 10 a table showing a result of Embodiment 8. Useable combinations of transmission variables 'transmission_method_combination_PART' which is a partial set of all combinations of transmission variables are selected by Embodiment 8. An index 'transmission method combination index' is assigned to each of the useable combinations of transmission variables 'transmission_method_combination-PART'.

Embodiment 9

In Embodiment 9, Equations 15-17 are also used.

Namely, Equation 15 is $N_{EP} \in \{408, 792, 1560, 2328, 3096, 3864\}$ and

Equation 16 is $$N_{Walsh,k}^{\max} = 28.$$

Equation 17 is $N_{slot,k} \in \{1, 2, 4\}$.

In accordance with the above-assumptions, $S_{1,1}$ can be represented by the following Equation.

$S_{1,1} = \{0.607, 1.175, 1.5, 1.8, 2.43, 2.688, 3.2\}$     Equation 30

In Equation 15, it is assumed that $$D = 6, N_{EP}^1 = 408, N_{EP}^2 =$$
$$792, N_{EP}^3 = 1560, N_{EP}^4 = 2328, N_{EP}^5 = 3096, N_{EP}^6 = 3864.$$

In Equation 17, it is assumed that $$G = 3, N_{slot,k}^1 = 1, N_{slot,k}^2 = 2, N_{slot,k}^3 = 4.$$

It is also assumed that all $S_{d,g}$ values are identical to $S_{1,1}$. Definition 1 and Equation 14 are also used to calculate a final number of Walsh codes $N'_{Walsh,k}$. Herein, the value of Lmax of Equation 14 is 7728.

In accordance with the above-assumptions, all combinations of transmission variables 'transmission_method_combination_ALL' that satisfy Equation 4 and Equation 5 are determined.

FIG. 11 is a table showing a result of Embodiment 9. Useable combinations of transmission variables 'transmission_method_combination_PART' which is a partial set of all combinations of transmission variables are determined by Embodiment 9. An index 'transmission method combination index' is assigned to each of the useable combinations of transmission variables 'transmission_method_combination_PART'.

Embodiment 10

In Embodiment 10, Equations 15 to 17 are used.

Namely, Equation 15 is $N_{EP} \in \{408, 792, 1560, 2328, 3096, 3864\}$ and Equation 16 is $$N_{Walsh,k}^{\max} = 28.$$

Equation 17 is $N_{slot,k} \in \{1, 2, 4\}$.

$S_{1,1}$ values can be represented by the following Equation.

$S_{1,1} = \{0.607, 1.175, 1.5, 2.0, 2.684, 3.2\}$     Equation 31

In Equation 15, it is assumed that $$D = 6, N_{EP}^1 = 408, N_{EP}^2 =$$
$$792, N_{EP}^3 = 1560, N_{EP}^4 = 2328, N_{EP}^5 = 3096, N_{EP}^6 = 3864.$$

In Equation 17, it is assumed that $$G = 3, N_{slot,k}^1 = 1, N_{slot,k}^2 = 2, N_{slot,k}^3 = 4.$$

It is also assumed that all $S_{d,g}$ values are identical to $S_{1,1}$ values. The Definition 1 and Equation 14 are also used to calculate a final number of Walsh codes $N'_{Walsh,k}$. Herein, it is assumed that the value of Lmax of Equation 14 is 7728.

In accordance with the above-assumptions, all combinations of transmission variables 'transmission_method_combination_ALL' that satisfy Equation 4 and Equation 5 are determined.

FIG. 12 is a table showing a result of Embodiment 10. Useable combinations of transmission variables 'transmission_method_combination_PART' which is a partial set of all combinations of transmission variables are selected by Embodiment 10 as above-mentioned. An index 'transmission method combination index' is assigned to each of the useable combinations of transmission variables 'transmission_method_combination_PART'.

As shown in FIG. 12, all three types of combinations of transmission variables belonging to indexes 'transmission method combination index' such as "11110" and "11111" are expressed as "reserved". These indexes "11110" and "11111" do not mean particular combinations of transmission variables and may be used for other purposes.

In case of CDMA2000 REVISION C, for example, a base station (BS) needs to send a command for switching "control hold state" to "active state" to a mobile station. The indexes "11110" and "11111" may be used for the command.

In other words, the Base station may use one of the indexes "11110" and "11111" for the above-purpose. If the Base station transmits one of the indexes "11110" and "11111" to the mobile station through PDCCH, the mobile Station can recognize the received index as the command for switching "control hold state" to "active state" and then operate according to rules that have been preset.

Embodiment 11

In Embodiment 11, Equations 15 to 17 are also used. Namely, Equation 15 is $N_{EP} \in \{408, 792, 1560, 2328, 3096, 3864\}$ and Equation 16 is $$G = 3, N_{slot,k}^1 = 1, N_{slot,k}^2 = 2, N_{slot,k}^3 = 4.$$

Equation 17 is $N_{slot,k} \in \{1, 2, 4\}$.

$S_{1,1}$ can be represented by the following Equation.

$$S_{1,1} = \{0.607, 1.175, 1.5, 2.0, 2.684, 3.2\} \quad \text{Equation 32}$$

In Equation 15, it is assumed that $$D = 6, N_{EP}^1 = 408, N_{EP}^2 = 792, N_{EP}^3 = 1560, N_{EP}^4 = 2328, N_{EP}^5 = 3096, N_{EP}^6 = 3864.$$

In Equation 17, it is assumed that $$G = 3, N_{slot,k}^1 = 1, N_{slot,k}^2 = 2, N_{slot,k}^3 = 4.$$

Also, it is assumed that all $S_{d,g}$ values are identical to $S_{1,1}$. Definition 1 and Equation 14 are used to calculate a final number of Walsh codes $N'_{Walsh,k}$. Herein, it is assumed that the value of Lmax of Equation 14 is 11592.

In accordance with the above-assumptions, all combinations of transmission variables 'transmission_method_combination_ALL' that satisfy Equation 4 and Equation 5 are determined.

FIG. 13 is a table showing a result of Embodiment 11. Useable combinations of transmission variables 'transmission_method_combination_PART' which is a partial set of all combinations of transmission variables are selected by Embodiment 11. An index 'transmission method combination index' is assigned to each of the useable combinations of transmission variables 'transmission_method_combination_PART'.

Embodiment 12

In Embodiment 12, Equations 15 to 17 are also used. Namely, Equation 15 is $N_{EP} \in \{408, 792, 1560, 2328, 3096, 3864\}$ and Equation 16 is $$N_{Walsh,k}^{max} = 28.$$

Equation 17 is $N_{slot,k} \in \{1, 2, 4\}$.

$S_{1,1}$ can be represented by the following Equation.

$$S_{1,1} = \quad \text{Equation 33}$$
$$\{0.41, 0.79, 1.10, 1.32, 1.50, 1.75, 1.95, 2.30, 2.85, 3.10\}$$

In Equation 15, it is assumed that $$D = 6, N_{EP}^1 = 408, N_{EP}^2 = 792, N_{EP}^3 = 1560, N_{EP}^5 = 3096, N_{EP}^6 = 3864.$$

In Equation 17, it is assumed that $$G = 3, N_{slot,k}^1 = 1, N_{slot,k}^2 = 1, N_{slot,k}^2 = 2, N_{slot,k}^3 = 4.$$

Also, it is assumed that all $S_{d,g}$ values are identical to $S_{1,1}$. Definition 1 and Equation 10 are used to calculate a final number of Walsh codes $N'_{Walsh,k}$.

In accordance with the above-assumptions, all combinations of transmission variables 'transmission_method_combination_ALL' that satisfy Equation 4 and Equation 5 are determined.

FIGS. 14A to 14D are tables showing a result of Embodiment 12. Useable combinations of transmission variables 'transmission_method_combination_PART' which is a partial set of all combinations of transmission variables are selected by Embodiment 12. An index 'transmission method combination index' is assigned to each of the useable combinations of transmission variables 'transmission_method_combination_PART' is shown in FIG. 15.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In accordance with the present invention, since selecting the subpacket designed for combinations of transmission variables of encoder packet allows the limited number of combinations of transmission variables to be used without big degradation in the system, an efficient implementation of sender/receiver terminal is possible. Moreover, it is possible to implement a sender/receiver terminal with decreased hardware complexity.

What is claimed is:

1. A method of transmitting at least one subpacket of an encoder packet in a communication system, the method comprising:

setting a plurality of combinations of transmission variables for transmitting a subpacket of an encoder packet;

defining a plurality of predetermined modulation order product code rates (MPRs), each predetermined MPR corresponds to each combination of numbers of available encoder packet bits and of numbers of available slots;

selecting an arbitrary combination of transmission variables from the plurality of combinations of transmission variables based on a number of currently available Walsh codes;

determining an arbitrary MPR based on a number of available encoder packet bits, a number of available slots, and the number of currently available Walsh codes, wherein the arbitrary MPR corresponds to the selected arbitrary combination of transmission variables;

selecting as a final MPR one of the plurality of predetermined MPRs, which corresponds to the number of available encoder packet bits and the number of available slots, that is greater than or equal to the arbitrary MPR and has a smallest difference;

calculating a final number of Walsh codes based on the number of available encoder packet bits, the number of available slots, and the selected final MPR;

determining available combinations of transmission variables from the plurality of combinations of transmission variables based on the numbers of available encoder packet bits, the numbers of available slots, and the final number of Walsh codes; and transmitting the subpacket of the encoder packet using one of the determined combination of transmission variables.

2. The method of claim 1, further comprising:

assigning an index to each of the available combinations of transmission variables;

storing the index-assigned combinations of transmission variables in a memory;

selecting one of the combinations of transmission variables; and transmitting a final index that corresponds to the selected combination to a receiving party through a physical channel.

3. The method of claim 2, wherein the physical channel is a packet data control channel (PDCCH).

4. The method of claim 2, wherein the index to each combination includes a total of six binary bits.

5. The method of claim 1, wherein at least two MPRs of the plurality of predetermined MPRs are identical to each other.

6. The method of claim 1, wherein each of the plurality of combinations of transmission variables includes a number of available Walsh codes and a number of available slots for transmitting the subpacket of the encoder packet, and a modulation order product code rate, a modulation order, and a code rate of the subpacket.

7. The method of claim 1, wherein the final number of Walsh codes $N'_{Walsh,k}$ is obtained by $$N'_{Walsh,k} = \left\lceil \frac{N^d_{EP}}{X \cdot MPR'_{k,d,g} \cdot N^g_{slot,k}} \right\rceil,$$

where the subpacket is a kth subpacket of the encoder packet, $MPR'_{k,d,g}$ represents the final MPR, $$N^d_{EP}$$

and $$N^g_{slot,k}$$

represent the numbers of available encoder packet bits and available slots, respectively, that belong to the selected arbitrary combination of variables, r represents a number of chips of the Walsh codes, y represents a transmission rate of each chip in Hz, X represents a value obtained by X=y× 1.25×10³/r, and ⌈A⌉ represents a smallest value of integral numbers that are greater than or equal to A.

8. The method of claim 1, wherein the final number of Walsh codes $N'_{Walsh,k}$ is obtained by $$N'_{Walsh,k} = \left\lceil \frac{N^d_{EP}}{X \cdot MPR'_{k,d,g} \cdot N^g_{slot,k}} \right\rceil$$

and a number of available Walsh codes obtained when $$N_{EP} = N^d_{EP}, N_{slot,k} = N^g_{slot,k}$$

from the plurality of combination of transmission variables that are greater than or equal to the smallest available Walsh codes obtained, where the subpacket is a kth subpacket of the encoder packet, $MPR'_{k,d,g}$ represents the final MPR, $$N^d_{EP}$$

and $$N^g_{slot,k}$$

represent the numbers of available encoder packet bits and available slots, respectively, that belong to the selected arbitrary combination of variables, r represents a number of chips of the Walsh codes, y represents a transmission rate of each chip in Hz, X represents a value obtained by X=y× 1.25×10³/r, and ⌈A⌉ represents a smallest value of integral numbers that are greater than or equal to A.

9. The method of claim 1, wherein the final number of Walsh codes $N'_{Walsh,k}$ is obtained by $$N'_{Walsh,k} = \min\left(\left\lceil \frac{N^d_{EP}}{48 \cdot MPR'_{k,d,g} \cdot N^g_{slot,k}} \right\rceil, \left\lfloor \frac{L_{max}}{48 \cdot N^g_{slot,k} \cdot m_{k,d,g}} \right\rfloor\right),$$

where the subpacket is a kth subpacket of the encoder packet, $MPR'_{k,d,g}$ represents the final MPR, $$N^d_{EP}$$

and $$N_{slot,k}^g$$

represent the numbers of available encoder packet bits and available slots, respectively, that belong to the selected arbitrary combination of variables, r represents a number of chips of the Walsh codes, y represents a transmission rate of each chip in Hz, X represents a value obtained by X=y x 1.25 x 10³/r, and ⌈A⌉ represents a smallest value of integral numbers that are greater than or equal to A, min(A, B) represents one of A and B that is less than or equal to the other, Lmax represents a limited number of transmission symbols, and $m_{k,d,g}$, represents a modulation order when the numbers of available encoder packet bits and available slots, respectively, that belong to the selected arbitrary combination of variables are $$N_{EP}^d$$

and $$N_{slot,k}^g,$$

respectively.

10. A method of transmitting at least one subpacket of an encoder packet in a communication system, the method comprising:

setting a plurality of combinations of transmission variables for transmitting a subpacket of an encoder packet;

defining a plurality of predetermined modulation order product code rates (MPRs), each predetermined MPR corresponds to each combination of numbers of available encoder packet bits and of numbers of available slots;

selecting an arbitrary combination of transmission variables from the plurality of combinations of transmission variables based on a number of currently available Walsh codes;

determining an arbitrary MPR based on a number of available encoder packet bits, a number of available slots, and the number of currently available Walsh codes, wherein the arbitrary MPR corresponds to the selected arbitrary combination of transmission variables;

if the arbitrary MPR is less than a threshold MPR value, selecting as a final MPR one of the plurality of predetermined MPRs which corresponds to the number of available encoder packet bits and the number of available slots, is greater than or equal to the arbitrary MPR and has a smallest difference;

if the arbitrary MPR is greater than or equal to the threshold MPR value, assigning the arbitrary MPR as the final MPR;

calculating a final number of Walsh codes based on the number of available encoder packet bits, the number of available slots, and the selected final MPR;

determining available combinations of transmission variables from the plurality of combinations of transmission variables based on the numbers of available encoder packet bits, the numbers of available slots, and the final number of Walsh codes; and transmitting the subpacket of the encoder packet using one of the determined combination of transmission variables.

11. The method of claim 10, further comprising:

assigning an index to each of the available combinations of transmission variables;

storing the index-assigned combinations of transmission variables in a memory;

selecting one of the able combinations of transmission variables; and transmitting a final index that corresponds to the selected combination to a receiving party through a physical channel.

12. The method of claim 11, wherein the physical channel is a packet data control channel (PDCCH).

13. The method of claim 11, wherein the index to each combination includes a total of six binary bits.

14. The method of claim 10, wherein at least two MPRs of the plurality of predetermined MPRs are identical to each other.

15. The method of claim 10, wherein each of the plurality of all combinations of transmission variables includes a number of available Walsh codes and a number of available slots for transmitting the subpacket of the encoder packet, and a modulation order product code rate, a modulation order, and a code rate of the subpacket.

16. The method of claim 10, wherein the final number of Walsh codes N'$_{Walsh,k}$ is obtained by $$N'_{Walsh,k} = \left\lceil \frac{N_{EP}^d}{X \cdot MPR'_{k,d,g} \cdot N_{slot,k}^g} \right\rceil,$$

where the subpacket is a kth subpacket of the encoder packet, MPR'$_{k,d,g}$ represents the final MPR, $$N_{EP}^d$$

and $$N_{slot,k}^g$$

represent the numbers of available encoder packet bits and available slots, respectively, that belong to the selected arbitrary combination of variables, r represents a number of chips of the Walsh codes, y represents a transmission rate of each chip in Hz, X represents a value obtained by X=yx 1.25×10³/r, and ⌈A⌉ represents a smallest value of integral numbers that are greater than or equal to A.

17. The method of claim 10, wherein the final number of Walsh codes N'$_{Walsh,k}$ is obtained by $$N'_{Walsh,k} = \left\lceil \frac{N_{EP}^d}{X \cdot MPR'_{k,d,g} \cdot N_{slot,k}^g} \right\rceil$$

and
a number of available Walsh codes obtained when $N_{EP} = N_{EP}^d, N_{slot,k} = N_{slot,k}^g$ from the plurality of all combination of transmission variables that are greater than or equal to the smallest available Walsh codes obtained, where the subpacket is a kth subpacket of the encoder packet, $MPR'_{k,d,g}$ represents the final MPR, $N_{EP}^d$ and $N_{slot,k}^g$ represent the numbers of available encoder packet bits and available slots, respectively, that belong to the selected arbitrary combination of variables, r represents a number of chips of the Walsh codes, y represents a transmission rate of each chip in Hz, X represents a value obtained by X=y× 1.25×10³/r, and ⌈A⌉ represents a smallest value of integral numbers that are greater than or equal to A.

18. The method of claim 10, wherein the final number of Walsh codes $N'_{Walsh,k}$ is obtained by $$N'_{Walsh,k} = \min\left(\left\lceil \frac{N_{EP}^d}{48 \cdot MPR'_{k,d,g} \cdot N_{slot,k}^g} \right\rceil, \left\lfloor \frac{L_{max}}{48 \cdot N_{slot,k}^g \cdot m_{k,d,g}} \right\rfloor\right),$$

where the subpacket is a kth subpacket of the encoder packet, $MPR'_{k,d,g}$ represents the final MPR, $N_{EP}^d$ and $N_{slot,k}^g$ represent the numbers of available encoder packet bits and available slots, respectively, that belong to the selected arbitrary combination of variables, r represents a number of chips of the Walsh codes, y represents a transmission rate of each chip in Hz, X represents a value obtained by X=y× 1.25×10³/r, and ⌈A⌉ represents a smallest value of integral numbers that are greater than or equal to A, min(A, B) represents one of A and B that is less than or equal to the other, Lmax represents a limited number of transmission symbols, and mk,d,g, represents a modulation order when the numbers of available encoder packet bits and available slots, respectively, that belong to the selected arbitrary combination of variables are $N_{EP}^d$ and $N_{slot,k}^g$, respectively.

* * * * *